US011541831B2

(12) United States Patent
Togo et al.

(10) Patent No.: US 11,541,831 B2
(45) Date of Patent: Jan. 3, 2023

(54) WORK VEHICLE

(71) Applicant: KUBOTA CORPORATION, Osaka (JP)

(72) Inventors: Manabu Togo, Sakai (JP); Jinto No, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/406,126

(22) Filed: Aug. 19, 2021

(65) Prior Publication Data
US 2022/0055554 A1    Feb. 24, 2022

(30) Foreign Application Priority Data

Aug. 20, 2020 (JP) .............................. JP2020-139581

(51) Int. Cl.
| B60R 16/02 | (2006.01) |
| B60G 9/02 | (2006.01) |
| B60G 17/005 | (2006.01) |
| B62D 21/14 | (2006.01) |

(52) U.S. Cl.
CPC ............ B60R 16/0215 (2013.01); B60G 9/02 (2013.01); B60G 17/005 (2013.01); B62D 21/14 (2013.01); B60G 2200/144 (2013.01); B60G 2204/202 (2013.01); B60G 2300/082 (2013.01)

(58) Field of Classification Search
CPC ............ B60R 16/027; B60G 2200/144; B60G 2204/202; H05K 7/1491
See application file for complete search history.

(56) References Cited

U.S. PATENT DOCUMENTS

| 5,746,389 A * | 5/1998 | Willmann ............ G02B 6/4478 |
| | | 242/615.3 |
| 9,070,419 B1 * | 6/2015 | Zhu ...................... G11B 33/128 |
| 9,668,372 B2 * | 5/2017 | Chen ..................... H05K 7/1491 |
| 10,182,511 B1 * | 1/2019 | Chen ........................ H05K 7/18 |
| 2005/0145582 A1 * | 7/2005 | Dubon ................. H05K 7/1491 |
| | | 361/826 |
| 2007/0017883 A1 * | 1/2007 | Bridges ................ H05K 7/1491 |
| | | 211/26 |

(Continued)

FOREIGN PATENT DOCUMENTS

| CN | 207819122 U * | 9/2018 | ............... H01B 7/08 |
| DE | 102018132387 B4 * | 7/2020 | |

(Continued)

*Primary Examiner* — Paul N Dickson
*Assistant Examiner* — Maxwell L Meshaka
(74) *Attorney, Agent, or Firm* — Keating and Bennett, LLP

(57) ABSTRACT

A link mechanism is provided between a first member and a second member to effect a bending/stretching motion in operative association with a telescopic expanding/contracting motion of the first member and the second member. A supporting mechanism is provided to support, to the link mechanism, a wire having flexibility and connected between a first device on the side of the first member and a second device on the side of the second member. The supporting mechanism fixes the wire to each link member of the link mechanism in position so that the wire is deformed while maintaining its state following a shape of the link mechanism in operative association with the bending/stretching motion of the link mechanism.

5 Claims, 16 Drawing Sheets

(56) References Cited

U.S. PATENT DOCUMENTS

| | | | | |
|---|---|---|---|---|
| 2007/0039902 A1* | 2/2007 | Lawrence | ............ | H05K 7/1491 211/26 |
| 2010/0058728 A1* | 3/2010 | Pfeifer | ................ | H02G 11/006 59/78.1 |
| 2012/0188725 A1 | 7/2012 | Masuda | | |
| 2013/0034334 A1* | 2/2013 | Fariello | ................ | H05K 7/1491 248/274.1 |
| 2013/0341471 A1* | 12/2013 | Yang | .................... | H05K 7/1491 248/65 |
| 2014/0339376 A1* | 11/2014 | Katou | .................... | B60R 16/027 248/49 |
| 2017/0294767 A1* | 10/2017 | Sano | .................... | B60R 16/027 |
| 2017/0297515 A1* | 10/2017 | Sekino | ................ | H02G 11/006 |
| 2018/0141505 A1* | 5/2018 | Sekino | ................ | H02G 3/0468 |
| 2018/0259999 A1* | 9/2018 | Yuan | .................... | G06F 1/16 |
| 2018/0361960 A1* | 12/2018 | Yamamoto | ............. | B60R 16/03 |
| 2020/0070748 A1* | 3/2020 | Kogure | .................... | B60J 5/06 |
| 2020/0176967 A1* | 6/2020 | Tomosada | .......... | B60R 16/0207 |
| 2021/0229608 A1* | 7/2021 | Yamamoto | .......... | B60R 16/0215 |

FOREIGN PATENT DOCUMENTS

| | | | | |
|---|---|---|---|---|
| JP | 2002225646 A  *  | 8/2002 | | |
| JP | 2008001241 A  *  | 1/2008 | .......... | B60L 11/1803 |
| JP | 2012-156197 A | 8/2012 | | |
| JP | 2013159224 A  *  | 8/2013 | | |
| JP | 2016032962 A  *  | 3/2016 | | |
| WO | WO-2006106190 A1 * | 10/2006 | .......... | B60R 16/027 |
| WO | WO-2018180422 A1 * | 10/2018 | .............. | B60K 6/26 |
| WO | WO-2021160884 A1 * | 8/2021 | | |

* cited by examiner

WORK VEHICLE

CROSS REFERENCE TO RELATED APPLICATIONS

This application claims the benefit of priority to Japanese Patent Application No. 2020-139581 filed on Aug. 20, 2020. The entire contents of this application are hereby incorporated herein by reference.

BACKGROUND OF THE INVENTION

1. Field of the Invention

The present invention relates to a work vehicle.

2. Description of the Related Art

Japanese unexamined patent application publication JP2012-156197A discloses a wire supporting apparatus supporting a wire having flexibility. In this wire supporting apparatus, a link mechanism is provided between a first member and a second member movable relative to each other in association with telescopic expansion/contraction motions thereof, and the link mechanism effects a bending or stretching motion in operative association with the expansion/contraction motion of the first member and the second member. A link member included in the link mechanism is provided with a tubular guide portion through the inside of which the wire is passed. When the link mechanism is bent or stretched in association with the expansion/contraction of the first and second members, the wire will be deformed to follow the link mechanism while being supported by the link mechanism and the guide member. With the wire supporting apparatus disclosed in JP2012-156197A, since the wire is supported to the link member of the link mechanism by being caused to pass through the tubular guide portion of the link member, the wire is readily movable relative to the link member and the guide member of the link mechanism. For this reason, when the link mechanism effects the bending/stretching motion, the wire will be deformed to follow the link mechanism and at the same time the wire will move relative to the link member and the guide member of the link mechanism. Consequently, there is a possibility of damage to the wire due to friction between this wire and the link member and the guide member of the link mechanism.

SUMMARY OF THE INVENTION

Preferred embodiments of the present invention reduce or prevent damage to a wire occurring during a bending/stretching motion of a link mechanism, in a wire supporting apparatus and in a work vehicle including such wire supporting apparatus.

A wire supporting apparatus according to a preferred embodiment of the present invention includes a link mechanism between a first member and a second member to effect a bending/stretching motion in operative association with a telescopic expanding/contracting motion of the first member and the second member and a supporting mechanism to support, to the link mechanism, a wire having flexibility and connected between a first device on a side of the first member and a second device on a side of the second member, wherein the supporting mechanism fixes the wire to each link member of the link mechanism in position so that the wire is deformed while maintaining its state following a shape of the link mechanism in operative association with the bending/stretching motion of the link mechanism.

With a preferred embodiment of the present invention described above, the wire is fixed in position to each link member of the link mechanism by the supporting mechanism. Thus, when the link mechanism effects a bending/stretching motion in association with an expansion/contraction of the first member and the second member, the wire will be deformed while maintaining its state following the shape of the link mechanism.

The wire is fixed in position to the link member of the link mechanism by the supporting mechanism when the link mechanism effects a bending/stretching motion. This reduces an amount of change in a positional relationship between the wire and the link member of the link mechanism, which in turn reduces the possibility of rubbing of the wire against the link member of the link mechanism. Consequently, damage to the wire can be reduced or prevented.

When the link mechanism effects the bending/stretching motion, the supporting mechanism effectively resists separation between the wire and the link member of the link mechanism, so it is readily possible for the link member of the link mechanism to define and function as a "protective member" for the wire.

According to a preferred embodiment of the wire supporting apparatus of the present invention, the supporting mechanism fixes the wire in position at a portion between a first hinge portion and a second hinge portion of the link member.

With the above-described preferred embodiment of the present invention, when a plurality of link members of the link mechanism is connected to each other via the hinge portions, the wire is fixed in position to the portions between the first and second hinge portions of the link members of the link mechanism. With this, in operative association with the bending/stretching motion of the link mechanism, the portion of the wire corresponding to the hinge portions can be readily bent/stretched. Consequently, a change in the positional relationship between the wire and the link members of the link mechanism is reduced or prevented, so that damage to the wire due to its rubbing against the link members of the link mechanism can be reduced or prevented advantageously.

According to a further preferred embodiment of a wire supporting apparatus of the present invention, the link member includes a plate, and the supporting mechanism fixes the wire in position so as to follow a surface portion of the link member.

With the preferred embodiment of the present invention described above, as the link member of the link mechanism includes a plate, even if the wire is rubbed against the link member of the link mechanism in association with the bending/stretching motion, the possibility of damage to this wire is reduced or minimized.

With the preferred embodiment of the present invention described above, as the link member of the link mechanism includes a plate, the wire can be easily fixed in position to the link member of the link mechanism by the supporting mechanism. Thus, there is obtained an advantage in terms of improvement in the productivity of the wire supporting apparatus also.

According to a further preferred embodiment of a wire supporting apparatus of the present invention, an inner edge of the link member is includes an outwardly bulging curve or a bent linear shape so as to create a gap between adjacent link members, when the link mechanism is bent maximally.

With the present preferred embodiment of the present invention described above, since a gap is created between adjacent link members of the link mechanism when this link mechanism is bent maximally, a possibility of entrapment of a foreign object such as a small stone or the like between the link members of the link mechanism when the link mechanism is bent is reduced or minimized. Therefore, it is possible to reduce or minimize a possibility of damage to the link mechanism due to such entrapment of a small stone or the like between the link members thereof.

With the above-described preferred embodiment of the present invention, as a result of the link member including an outwardly bulging curve or a bent linear shape, it is possible to create a relatively large gap, as compared with an arrangement of the inner edge of the link member of the link mechanism being linear. This is advantageous in further reducing the possibility of entrapment of a small stone or the like between the link members of the link mechanism.

According to a further preferred embodiment of a wire supporting apparatus of the present invention, the wire is fixed in position to the link member of the link mechanism by the supporting mechanism such that the wire is located close to the hinge portion of the link member when the link mechanism is bent maximally, and the hinge portion of the link member and the portion of the wire fixed in position to the link member by the supporting mechanism are arranged side by side substantially linearly, when the link mechanism is bent maximally.

With the above-described further preferred embodiment of the present invention, as the wire is fixed in position to the link member of the link mechanism by the supporting mechanism such that the wire is located close to the hinge portion of the link member when the link mechanism is bent maximally, the deformed portion of the wire is positioned close to the hinge portion of the link member of the link mechanism. Thus, it becomes readily possible to realize the state of the wire following the link member.

With the above, when the link mechanism is bent or stretched, any resultant change in the positional relationship between the wire and the link member of the link mechanism can be reduced or prevented. This is advantageous in reducing or preventing the damage of the wire due to it being rubbed against the link member of the link mechanism, thus being advantageous in causing the link member of the link mechanism to define and function as a protective member for the wire.

For instance, when the wire is deformed due to bending, this may apply a load to the wire. With a preferred embodiment of the present invention described above, the portion of the wire fixed in position to the link member by the supporting mechanism and the hinge portion of the link member are arranged side by side linearly (or substantially linearly), so that the wire is linear (or substantially linear). Therefore, a load can hardly act on the wire. Consequently, in the state of the link mechanism being bent/stretched, the load to be applied to the wire can be reduced or minimized at least when the link mechanism is stretched maximally. Therefore, this is advantageous in improvement of the durability of the wire.

A preferred embodiment of the present invention is applicable also to a work vehicle including the above-described wire supporting apparatus. In a work vehicle according to a preferred embodiment of the present invention, the first member includes a first wheel supporting member supported to a machine body, the second member includes a second wheel supporting member supported to the first wheel supporting member to be expandable/contractable along a left/right direction and supporting a traveling wheel, the link mechanism is provided between the first wheel supporting member and the second wheel supporting member and is bent/stretched in association with expansion/contraction of the first wheel supporting member and the second wheel supporting member, and the supporting mechanism supports the wire to the link mechanism and fixes the wire in position to each link member of the link mechanism so that the wire is deformed while maintaining its state following the shape of the link mechanism in operative association with the bending/stretching motion of the link mechanism.

In a known work vehicle, there are provided a first wheel supporting member supported to a machine body and a second wheel supporting member supporting a wheel, the second wheel supporting member is supported to the first wheel supporting member to be expandable/contractable along the left/right direction, thus allowing change of the tread.

With the preferred embodiment of the present invention described above, in such a work vehicle described above, a wire supporting apparatus capable of supporting a wire is provided between the first wheel supporting member and the second wheel supporting member. According to a preferred embodiment of the present invention, since the wire is fixed in position to a respective link member of the link mechanism by the supporting mechanism, when the link mechanism effects an expanding/contracting motion in operative association with expansion/contraction of the first wheel supporting member and the second wheel supporting member, the wire is deformed while maintaining the state of following the shape of the link mechanism.

As the wire is fixed in position to the link member of the link mechanism by the supporting mechanism, the resultant change in the positional relationship between the wire and the link member of the link mechanism is small when the link mechanism effects an expanding/contracting motion. Therefore, the possibility of the wire being rubbed against the link member of the link mechanism is reduced or minimized, thus reducing or preventing damage to the wire. When the link mechanism is expanded/contracted, separation between the wire and the link member of the link mechanism is effectively resisted due to the supporting mechanism, so it is readily possible for the link member of the link mechanism to define and function as a protective member for the wire.

According to a preferred embodiment of the work vehicle of the present invention the link mechanism is disposed upwardly of the first wheel supporting member and the second wheel supporting member and is bent/stretched along the horizontal plane in association with expansion/contraction of the second wheel supporting member.

With the preferred embodiment of the present invention described above, as the link mechanism is disposed upwardly of the first wheel supporting member and the second wheel supporting member, the wire is disposed at a high position upwardly of the first wheel supporting member and the second wheel supporting member, so that even if a foreign object present in a work site is flipped up by the wheel, this foreign object of the work site flipped up will hardly hit the wire.

For instance, if the link mechanism is bent upwards in association with expansion/contraction of the second wheel supporting member, there arises the possibility of this link mechanism interfering with some other portion of the work vehicle. Further, if the link mechanism is bent downwards in association with expansion/contraction of the second wheel supporting member, there arises the possibility of this link mechanism interfering with a foreign object such as an agricultural product of the work site.

With the preferred embodiment of the present invention described above, since the link mechanism is bent/stretched along the horizontal plane in association with expansion/contraction of the second wheel supporting member, it is possible to reduce or prevent the possibility of the link mechanism interfering with some other portion of the work vehicle or with a foreign object or an agricultural product of the work site.

According to a preferred embodiment of a work vehicle of the present invention, the link mechanism is disposed downwardly of the wire.

With the preferred embodiment of the present invention described above, even if a foreign object present in a work site is flipped up by the wheel, since the lower side of the wire is protected by the link mechanism, this foreign object of the work site flipped up will hardly hit the wire.

According to a preferred embodiment of a work vehicle of the present invention, the work vehicle further includes a machine body frame disposed along a front/rear direction, the first wheel supporting member is supported to a lower portion of the machine body frame to be capable of rolling about an axis extending along the front/rear direction, the first wheel supporting member protruding laterally outwards from the machine body frame, the second wheel supporting member is supported to a portion of the first wheel supporting member protruding laterally outwards from the machine body frame to be expandable/contractable, and the wire supporting apparatus is disposed on a laterally outer side of the machine body frame.

In a work vehicle, the first wheel supporting member is sometimes supported to a lower portion of the machine body frame to be capable of rolling. Under this condition, according to a preferred embodiment of the present invention, the wire supporting apparatus is disposed on a laterally outer side of the machine body frame and the wire supported to this wire supporting apparatus is also disposed on the laterally outer side of the machine body frame. With this arrangement, even when the first wheel supporting member effects its rolling action, there will not occur such a situation of the wire supporting apparatus or the wire being entrapped between the first wheel supporting member and the machine body frame to be damaged thereby.

According to a preferred embodiment of a work vehicle of the present invention, the first device includes a controller supported to the machine body, the second device includes a steering angle sensor included in the second wheel supporting member and capable of detecting a steering angle of the wheel, the wire includes a harness having flexibility and connected to/between the controller and the steering angle sensor, and of position fixing portions of the harness by the supporting mechanism, a position closest to the steering angle sensor is set such that when a connecting portion of the harness to the steering angle sensor is pivoted relative to the steering angle sensor in association with the bending/stretching motion of the link mechanism, the connecting portion is not pivoted beyond a predetermined angle.

As described above, in case the tread of a work vehicle is adapted to be variable by the first wheel supporting member and the second wheel supporting member, it is sometimes provided that a steering angle sensor to detect a steering angle of the wheel is included in the second wheel supporting member and a harness is connected between a controller of the machine body and the steering angle sensor.

In such case, when the link mechanism effects the bending/stretching motion in association with expansion/contraction of the second wheel supporting member, as the harness too is deformed together with the link member of the link mechanism, there is possibility of the connecting portion of the harness to the steering angle sensor being pivoted relative to the steering angle sensor, thus being damaged.

With a preferred embodiment of the present invention described above, even when the connecting portion of the harness to the steering angle sensor is pivoted relative to the steering angle sensor in association with the bending/stretching motion of the link mechanism, there is provided suppression to prevent the connecting portion of the harness to the steering angle sensor from being pivoted beyond the predetermined angle. Thus, damage to the connecting portion of the harness to the steering angle sensor can be reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
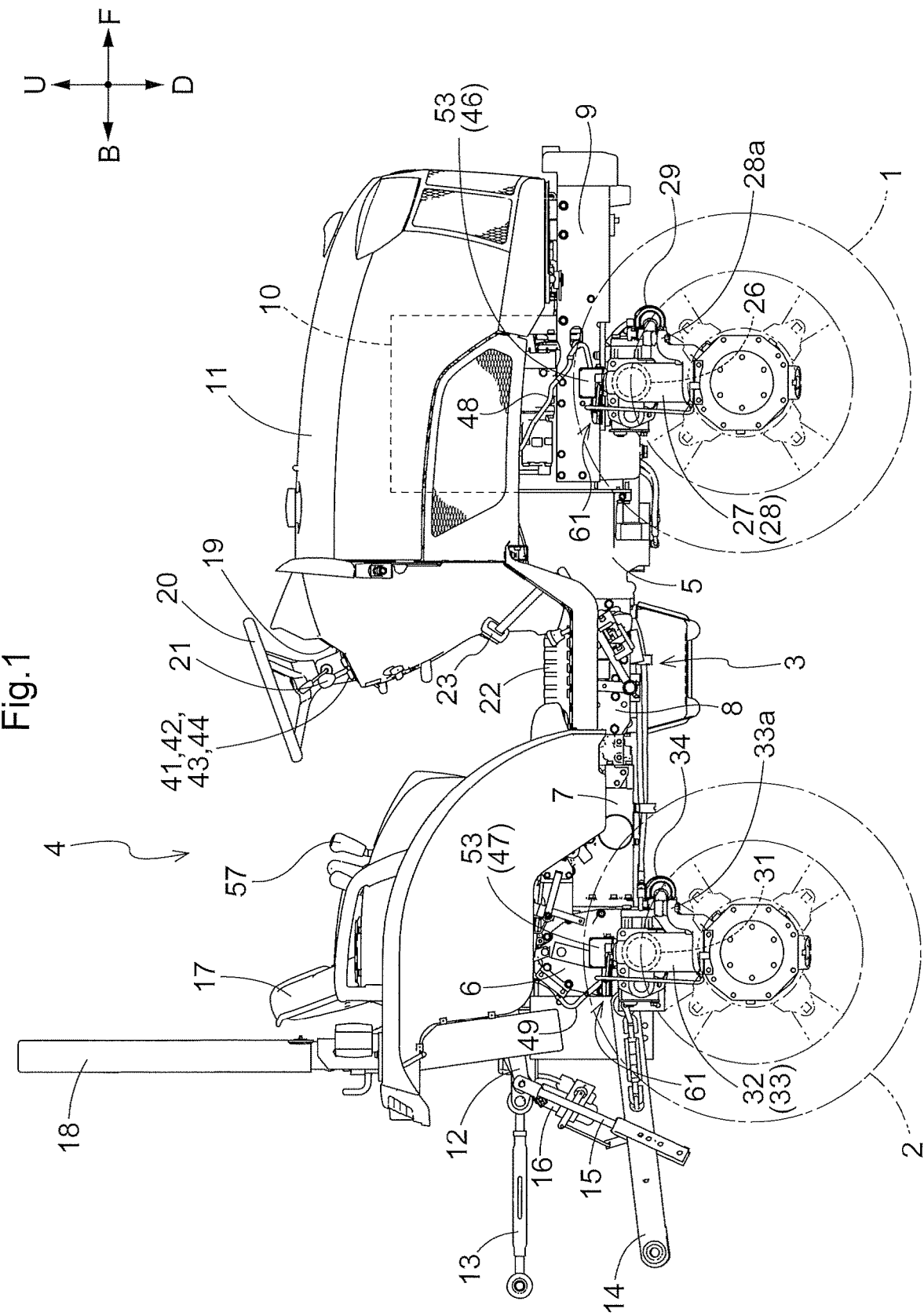
FIG. 1 is a right side view of a tractor.

FIGS. 1-17 show a wire supporting apparatus 61 relating to preferred embodiments of the present invention and tractors as examples of a "work vehicle" including the inventive wire supporting apparatus 61. In FIGS. 1-17, a sign F denotes the front direction, a sign B denotes the rear direction, a sign U denotes the upper direction, a sign D denotes a lower direction, a sign R denotes a right direction and a sign L denotes a left direction, respectively.

As shown in FIGS. 1-4, a machine body 3 is supported by left and right front wheels 1 and left and right rear wheels 2. The left and right front wheels 1 and the left and right rear wheels 2 correspond to what is referred to as "wheels" herein. The machine body 3 includes a driving section 4. A utility implement (not shown) such as a chemical agent sprayer or the like is supported to a rear portion of the machine body 3.

Figure 5:
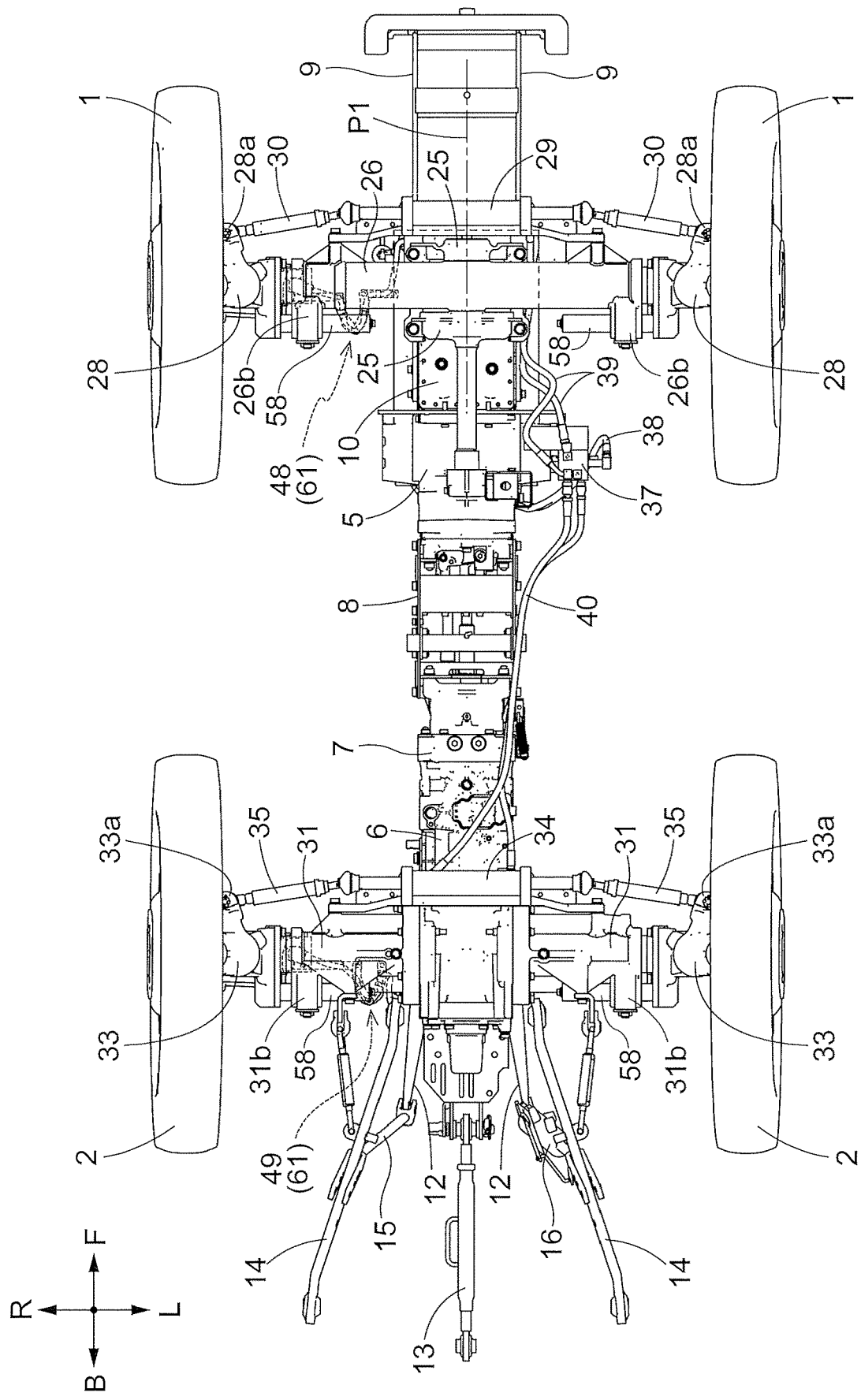
FIG. 5 is a bottom view of the tractor.

As shown in FIG. 1 and FIG. 5, the machine body 3 includes a front transmission case 5, a rear transmission case 6, a hydrostatic stepless variable transmission 7, machine body frames 8, 9, etc. To a front portion of the rear transmission case 6, the stepless variable transmission 7 is coupled. The machine body frame 8 in the form of a channel is coupled between the front transmission case 5 and the stepless variable transmission 7.

The left and right machine body frames 9 are coupled to the front transmission case 5 and disposed along the front/rear direction. The machine body frames 9 support the left and right front wheels 1. The left and right rear wheels 2 are supported to the rear transmission case 6.

Figure 2:
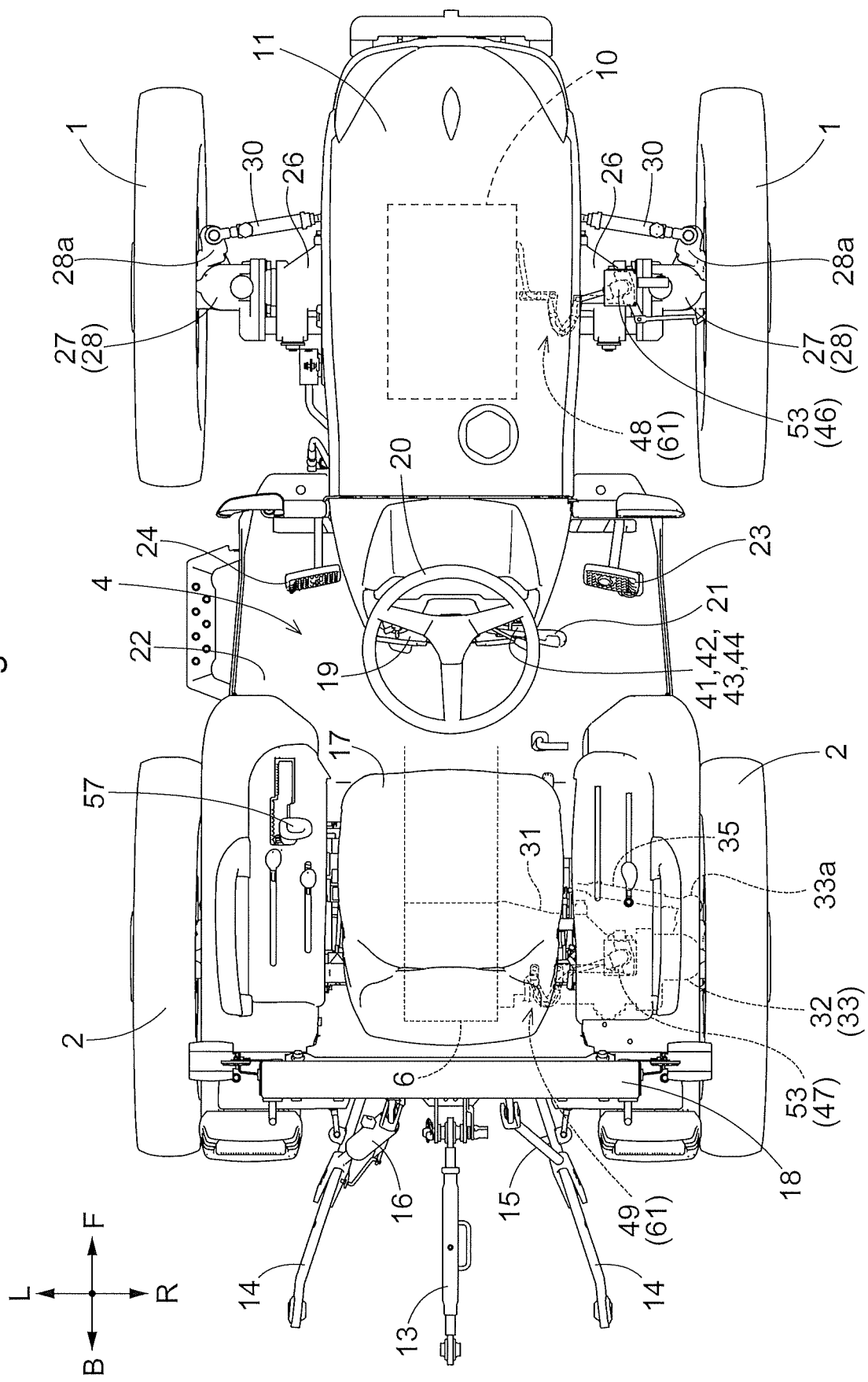
FIG. 2 is a plan view of the tractor.
Figure 3:
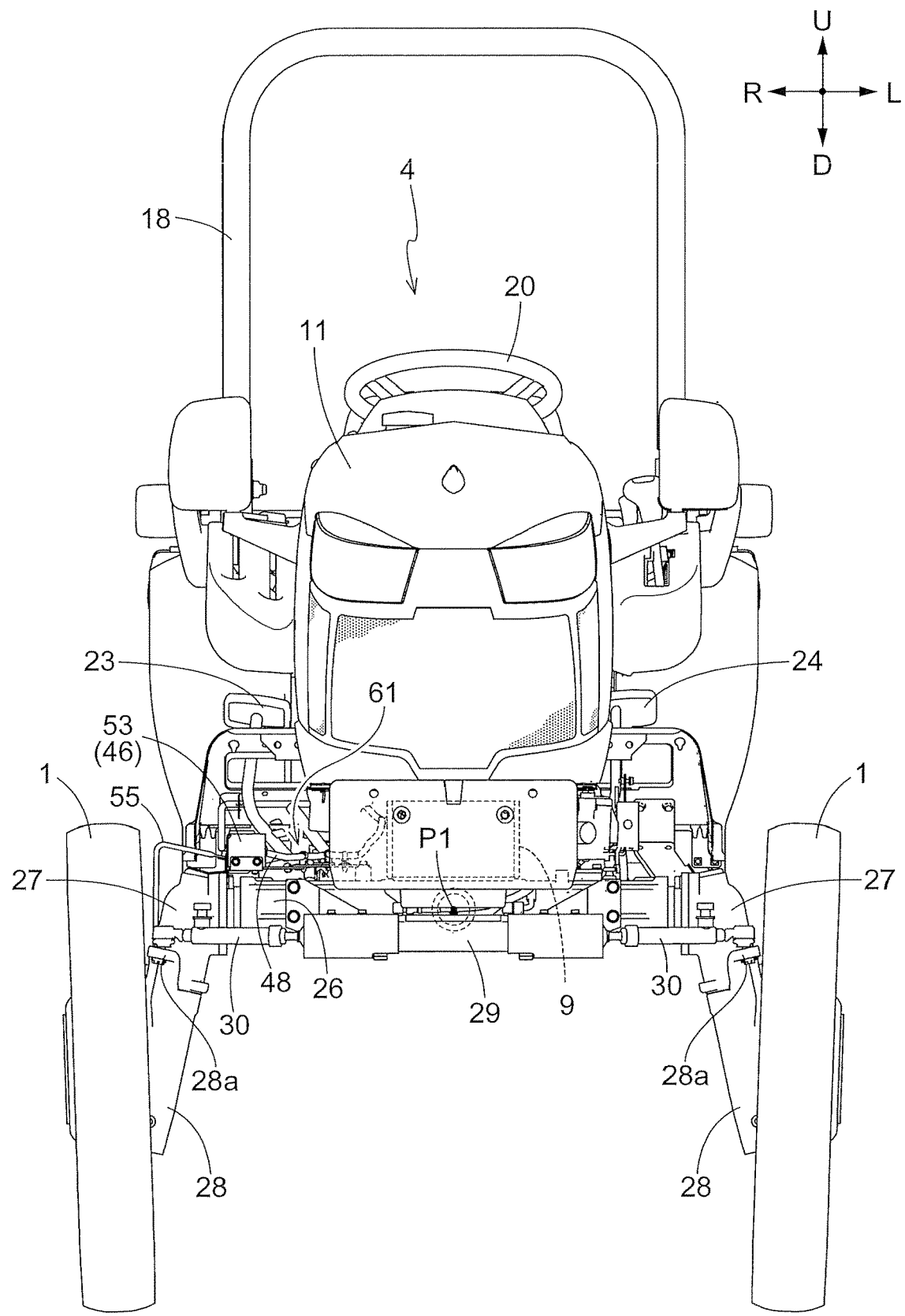
FIG. 3 is a front view of the tractor.

As shown in FIGS. 1-3, an engine 10 is operably coupled to a front portion of the front transmission case 5 and upper portions of the machine body frames 9. The engine 10 is covered by a hood 11. Inside the front transmission case 5, a transmission shaft and transmission gears which are not shown are provided and an unillustrated transmission shaft is connected between the front transmission case 5 and the stepless variable transmission 7. Power of the engine 10 is transmitted to the stepless variable transmission 7 via these transmission shaft and transmission gears provided between the front transmission case 5 and the stepless variable transmission 7.

The stepless variable transmission 7 is capable of changing a speed in a stepless manner in both a forward traveling direction and a reverse traveling direction. Inside the rear transmission case 6, there are provided an unillustrated auxiliary speed changer and unillustrated differential(s) for the left and right rear wheels 2. In operation, the power of the stepless variable transmission 7 is transmitted to the left and right rear wheels 2 via these auxiliary speed changer and rear wheel differential(s).

In the front transmission case 5, there are provided an unillustrated transmission shaft for the left and right front wheels 1 and unillustrated differentials for the left and right front wheels 1. Also, an unillustrated transmission shaft is connected between the front transmission case 5 and the rear transmission case 6. Immediately before the differentials provided inside the rear transmission case 6, power from the engine 10 is divided into power for the left and right front wheels 1 and power for the left and right rear wheels 2. The power for the left and right front wheels 1 is transmitted from the rear transmission case 6 via the transmission shaft extending between the front transmission case 5 and the rear transmission case 6 and the transmission shaft included in the front transmission case 5 and the differential inside the front transmission case 5.

As shown in FIGS. 1, 2, 4 and 5, at rear portions of the rear transmission case 6, there are provided left and right lift arms 12 which are pivotally operated vertically, a top link 13 which can be pivoted vertically and left and right lower links 14 which can be pivoted vertically. A link rod 15 is connected between the right lift arm 12 and the right lower link 14. A double-acting rolling cylinder 16 is connected between the left lift arm 12 and the left lower link 14.

The implement can be operably coupled to rear end portions of the top link 13 and the lower links 14. The implement is supported to the machine body 3 to be able to be lifted up/down via the top link 13 and the lower links 14. When the left and right lift arms 12 are pivotally operated up/down, the implement is elevated or lowered. When the rolling cylinder 16 is expanded or contracted, the implement is activated for its rolling operation about its connecting portion to the right lower link 14 which acts as the fulcrum.

As shown in FIGS. 1-4, at the driving section 4, a driver's seat 17 is supported to the rear transmission case 6. A ROPS frame 18 is coupled to a rear portion of the rear transmission case 6. The ROPS frame 18 is disposed on the rear side relative to the driver's seat 17 and extends above the driver's seat 17.

An operational panel 19 is provided on the rear side of the hood 11. This operational panel 19 includes a steering wheel and an accelerator lever 21. The accelerator lever 21 is located on the lower side of the right side relative to the steering wheel 20. The accelerator lever 21 is capable of operating an accelerator portion (not shown) of the engine 10. A speed changer lever 57 is provided on the left side of the driver's seat 17. This speed changer lever 57 is capable of operating the stepless variable transmission 7.

A floor 22 is provided on the lower portions of the driving section 4. A right brake pedal 23 is provided on the front right side of the floor 22 and a left brake pedal 24 is provided on the front left side of the floor 22.

As shown in FIG. 3 and FIG. 5, a support bracket 25 is coupled to lower portions of the left and right machine body frames 9. As shown in FIG. 2, FIG. 3 and FIG. 5, a front axle case 26 in the form of a round pipe is supported to the support bracket 25 to be capable of rolling about an axis P1 extending along the front/rear direction. The front axle case 26 corresponds to what is referred to as a "first member" and a "first wheel supporting member" herein.

More particularly, the front axle case 26 is supported to the machine body 3 by being supported to the lower portions of the machine body frames 9 to be capable of rolling about the axis P1 extending along the front/rear direction. The front axle case 26 extends to a more laterally outer side than the machine body frames 9 along the left/right direction.

At left and right portions of the front axle case 26 protruding to the laterally outer sides beyond the machine body frames 9, there are supported left and right wheel supporting cases 27. The left and right wheel supporting cases 27 are expandable/contractable in the left/right direction. Left and right wheel supporting cases 28 are supported to lower portions of the left and right wheel supporting cases 27. The left and right wheel supporting cases 28 are steerable about an axis extending along the vertical direction. The left and right front wheels 1 are supported to the left and right wheel supporting cases 28. The left and right wheel supporting cases 27 correspond to what is referred to as "second members" and "second wheel supporting members" herein. Also, the left and right wheel supporting cases correspond to what is referred to as "second members" and "second wheel supporting members" herein.

As shown in FIG. 3, FIG. 5, FIG. 6, FIG. 7 and FIG. 9, a double-acting steering cylinder 29 is coupled to a supporting portion 26a at the front portion of the front axle case 26 via a bracket 51. This steering cylinder 9 is capable of rolling about the axis P1 together with the front axle case 26. From the steering cylinder 29, piston rods 29a are extended to the left and right sides, respectively. Left and right tie rods 30 are connected between the piston rods 29a of the steering cylinder 29 and knuckle arms 28a of the wheel supporting cases 28.

In operation, when the piston rods 29a of the steering cylinder 29 are slid in the left/right direction, the wheel supporting cases 28 are operated for steering via the tie rods 30, thus steering the front wheels 1.

As described above, the power of the transmission shaft for front wheel transmission of the front transmission case 5 is transmitted from the front wheel differentials (not shown) and the transmission shaft (not shown) inside the front axle case 26 to the front wheels 1, via the transmission gears (not shown) inside the wheel supporting cases 27, 28.

Figure 4:
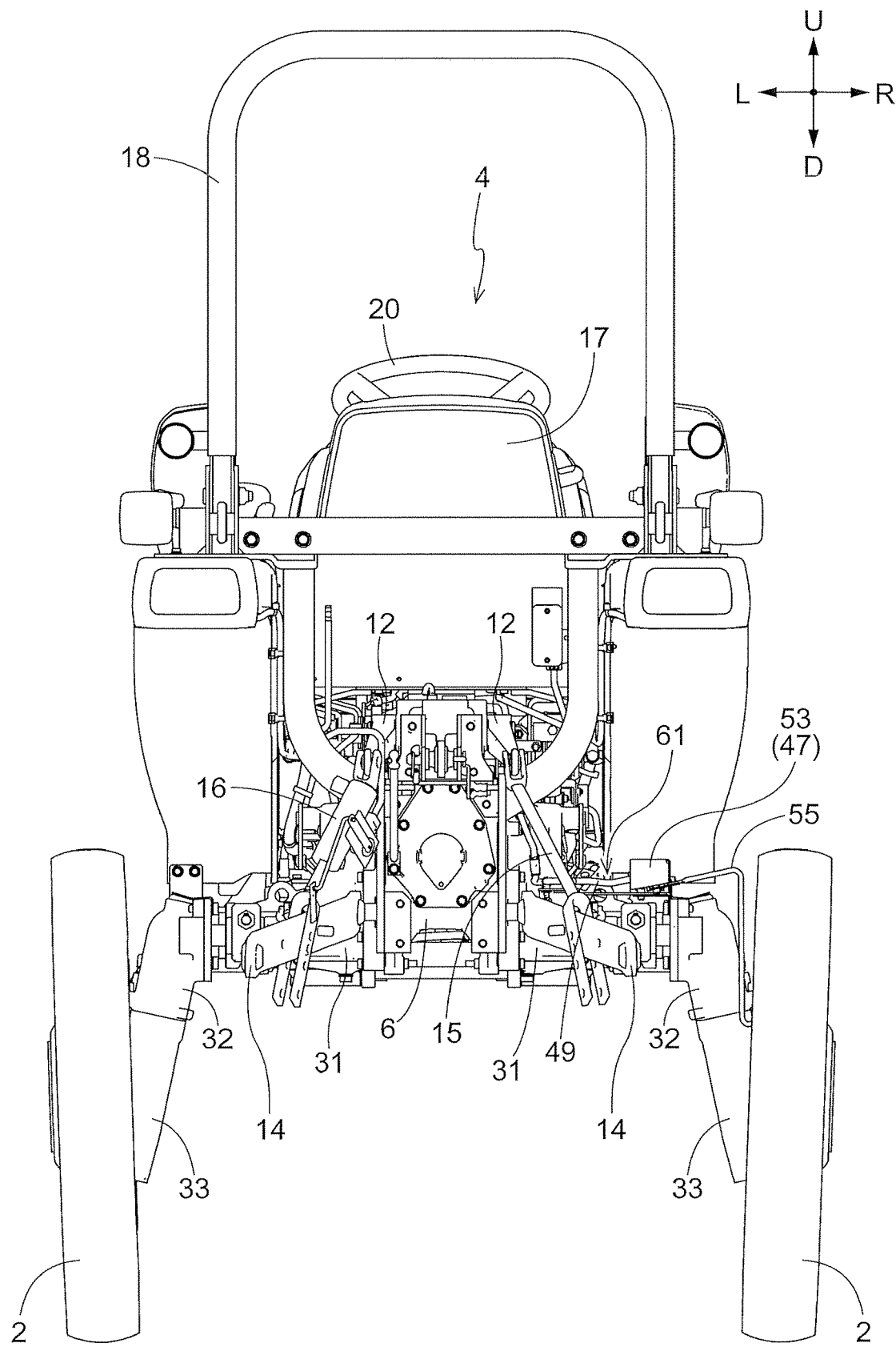
FIG. 4 is a rear view of the tractor.

As shown in FIG. 4 and FIG. 5, left and right rear axle cases 31 are coupled to a right portion and a left portion of the rear transmission case 6. The left and right rear axle cases 31 extend to laterally outer sides of the rear transmission case 6, whereby the rear axle cases 31 are supported to the machine body 3. The left and right rear axle cases 31 correspond to what is referred to as a "first member" and a "first wheel supporting member" herein.

Left and right wheel supporting cases 32 are supported to the right end portions and the left end portions of the rear axle cases 31. The left and right wheel supporting cases 32 are capable of being expanded/contracted in the left/right direction. Left and right wheel supporting cases 33 are supported to lower portions of the left and right wheel supporting cases 32. The left and right wheel supporting cases 33 are steerable about an axis extending along the vertical direction. The left and right rear wheels 2 are supported to the left and right wheel supporting cases 33. The left and right wheel supporting cases 32 correspond to what is referred to as a "second member" and a "second wheel supporting member" herein. Also, the left and right wheel supporting cases 33 correspond to what is referred to as a "second member" and a "second wheel supporting member" herein.

As shown in FIG. 4, FIG. 5, FIG. 14 and FIG. 15, a double-acting steering cylinder 34 is coupled to supporting portions 31a at the front portions of the left and right rear axle cases 31 via a bracket 51. This steering cylinder 34 is disposed on the lower side relative to the rear transmission case 6 and extends along the left/right direction. Piston rods 34a are extended from the steering cylinder 34 to the left and right sides, respectively. Left and right tie rods 35 are connected between the piston rods 34a of the steering cylinder 34 and knuckle arms 33a of the wheel supporting cases 33.

In operation, when the piston rods 34a of the steering cylinder 34 are slid in the left/right direction, the wheel supporting cases 33 are operated for steering via the tie rods 35, thus steering the rear wheels 2.

As described above, the power of the transmission shaft from the differential of the rear wheel transmission case 6 is transmitted to the rear wheels 2 via the transmission shafts (not shown) and the transmission gears (not shown) inside the rear axle cases 31 and the wheel supporting cases 32, 33.

Figure 17:
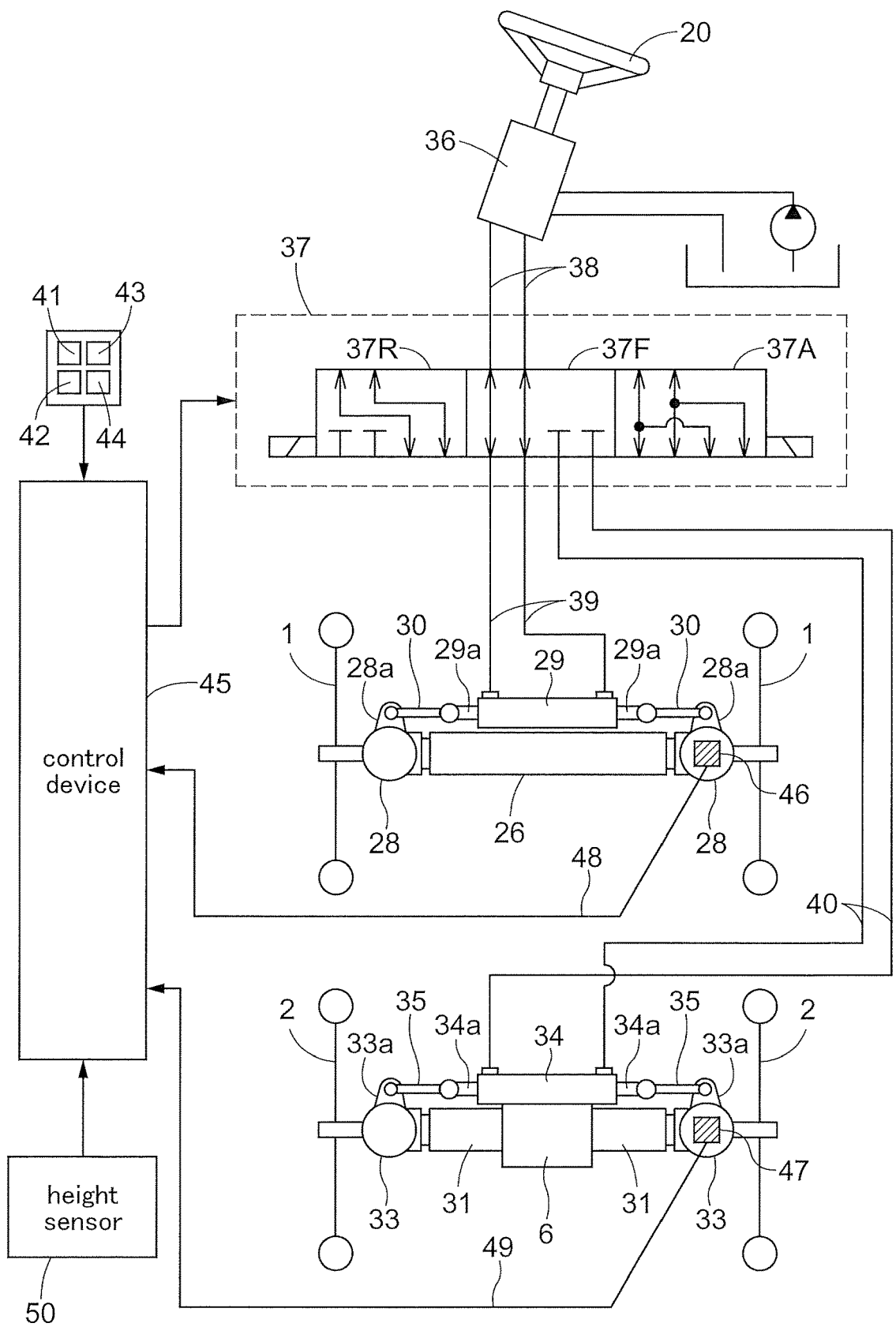
FIG. 17 is a circuit diagram of a hydraulic system for steering front wheels and rear wheels.

As shown in FIG. 17, a full-hydraulic power steering apparatus 36 is provided in the machine body 3. The power steering apparatus 36 is operated by the steering wheel 20.

As shown in FIG. 5 and FIG. 17, a mode switching apparatus 37 that is controlled by electromagnetic operation is provided in the machine body 3. Hydraulic hoses 38 are connected between the power steering apparatus 36 and the mode switching apparatus 37. Work oil is supplied from the power steering apparatus 36 to the mode switching apparatus 37 based on an operation of the steering wheel 20.

Hydraulic hoses 39 are connected between the mode switching apparatus 37 and the steering cylinder 29. Hydraulic hoses 40 are connected between the mode switching apparatus 37 and the steering cylinder 34. The mode switching apparatus 37 is movable to a front wheel steering position 37F, a rear wheel steering position 37R and a four-wheel steering position 37A.

When the mode switching apparatus 37 is in the front wheel steering position 37F, the work oil of the power steering apparatus 36 is supplied to the steering cylinder 29 and also supply of the work oil to the steering cylinder 34 is blocked, whereby a steering operation of the front wheels 1 by the steering cylinder 29 is effected.

When the mode switching apparatus 37 is in the rear wheel steering position 37R, the work oil of the power steering apparatus 36 is supplied to the steering cylinder 34 and also supply of the work oil to the steering cylinder 29 is blocked, whereby a steering operation of the rear wheels 2 by the steering cylinder 34 is effected.

When the mode switching apparatus 37 is in the four-wheel steering position 37A, the work oil of the power steering apparatus 36 is supplied to both the steering cylinders 29, 34. And, a steering operation of the front wheels 1 by the steering cylinder 29 and also a steering operation of the rear wheels 2 by the steering cylinder 34 are effected. In this case, the front wheels 1 and the rear wheels 2 will be operated in opposite phases by the steering cylinders 29, 34 respectively.

As shown in FIG. 1, FIG. 2 and FIG. 17, a front wheel mode switch 41, a rear wheel mode switch 42, a four-wheel mode switch 43, and an automatic mode switch 44 are provided in the operational panel 19. These mode switches 41-44 are disposed on the right side relative to the steering wheel 20. The machine body 30 includes a controller 45 (corresponding to a "first device"). Each of operational signals of these mode switches 41-44 are inputted to the controller 45.

The right wheel supporting cases 27, 28 include a steering angle sensor 46 (corresponding to a "second device"). The steering angle sensor 46 is configured to be capable of detecting a steering angle of the front wheel 1. Between the controller 45 and the steering angle sensor 46, a harness 48 (corresponding to a "wire") is connected. This harness 48 has flexibility. A detection signal of the steering angle sensor 46 is inputted to the controller 45 via the harness 48.

The right wheel supporting cases 32, 33 include a steering angle sensor 47 (corresponding to a "second device"). The steering angle sensor 47 is capable of detecting a steering angle of the rear wheel 2. A harness 49 (corresponding to a "wire") is connected between the controller 45 and the steering angle sensor 47. This harness 49 has flexibility. A detection signal of the steering angle sensor 47 is inputted to the controller 45 via the harness 49.

Each of the harnesses 48, 49, includes a plurality of signal wires and power wires and is accommodated inside a flexible corrugated tube in the form of bellows. Details of the steering angle sensors 46, 47 will be described later.

A height sensor 50 shown in FIG. 17 detects a vertical angle of the lift arm 12 (see FIG. 1) or an operational position of a lift lever (not shown) to pivotally operate the lift arm 12. The implement is coupled to the top link 13 and the lower links 14. A height of the implement relative to the machine body 3 is detected by the height sensor 50. A detection signal of the height sensor 50 is inputted to the controller 45.

In the controller 45, a front wheel mode, a rear wheel mode, a four-wheel mode and an automatic mode are set as will be described below. The mode switching apparatus 37 is switched to the front wheel steering position 37F, the rear wheel steering position 37R and the four-wheel steering position 37A.

Under a stopped state of the engine 10, when this engine 10 is started, the front wheel mode will be set unconditionally by the controller 45 and the mode switching apparatus 37 will be moved to the front wheel steering position 37F.

In the rear wheel mode (or four-wheel mode or automatic mode) when the engine 10 is under operation, if detection by the steering angle sensor 47 indicates that the rear wheels 2 are not in straight traveling positions, the rear wheel mode (or four-wheel mode or automatic mode) will be maintained even if the front wheel mode switch 41 is pushed (operated). After the front wheel mode switch 41 is pushed (operated) when the rear wheels are not in the straight traveling positions, the rear wheels 2 are steered to the straight traveling positions. Then, when the steering angle sensor 47 detects the rear wheels 2 being located at the straight traveling positions, the controller 45 is switched to the front wheel mode. And, the mode switching apparatus 37 is moved to the front wheel steering position 37F. Incidentally and alternatively, if the front wheel mode switch 41 is pushed (operated) when the rear wheels are not in the straight traveling positions, the controller 45 may be directly switched to the front wheel mode. In this case, the mode switching apparatus 37 may be moved to the front wheel steering position 37F, upon detection by the steering angle sensor 47 of the rear wheels 2 being located at the straight traveling positions.

Under the front wheel mode (or four-wheel mode or automatic mode) during operation of the engine 10, if detection by the steering angle sensor 46 indicates that the front wheels 1 are not located in straight traveling positions, the front wheel mode (or four-wheel mode or automatic mode) will be maintained even if the rear wheel mode switch 42 is pushed (operated). After the rear wheel mode switch 42 is pushed (operated) when the front wheels 1 are not at the straight traveling positions, the front wheels 1 are steered to the straight traveling positions. Then, when the steering angle sensor 46 detects the front wheels 1 being located at the straight traveling positions, the controller 45 is switched to the rear wheel mode. And, the mode switching apparatus 37 is moved to the rear wheel steering position 37R. Incidentally and alternatively, if the rear wheel mode switch 42 is pushed (operated) when the front wheels 1 are not at the straight traveling positions, the controller 45 may be directly switched to the rear wheel mode. In this case, the mode switching apparatus 37 may be moved to the rear wheel steering position 37R, upon detection by the steering angle sensor 46 of the front wheels 1 being located at the straight traveling positions.

In the front wheel mode (or four-wheel mode or automatic mode) when the engine 10 is under operation, if the four-wheel mode switch 43 is pushed (operated), the controller 45 is switched to the four-wheel mode. And, based on detections by the steering angle sensors 46, 47, the front wheels 1 and the rear wheels 2 are steered to the straight traveling positions, and then, the mode switching apparatus 37 is moved to the four-wheel steering position 37A. Incidentally and alternatively, in case the front wheels 1 or the rear wheels 2 are not in the straight traveling positions, the controller 45 may not be switched to the four-wheel mode immediately even when the four-wheel mode switch 43 is pushed (operated). In this case, the controller 45 may be switched to the four-wheel mode after both the front wheels 1 and the rear wheels 2 are steered to the straight traveling positions.

If the automatic mode switch 44 is pushed (operated) during an operation of the engine 10, the automatic mode is set by the controller 45. In this automatic mode, based on a forward traveling state and a reverse traveling state of the machine body 3 and a height of the implement relative to the machine body 3 (a detection value of the height sensor 50), any appropriate one of the front wheel mode, the rear wheel mode and the four-wheel mode is automatically selected and set by the controller 45. And, the mode switching apparatus 37 is operated correspondingly to one of the front wheel steering position 37F, the rear wheel steering position 37R and the four-wheel steering position 37A.

As examples of situations where the mode is switched to the front wheel mode, the rear wheel mode or the four-wheel mode from the automatic mode, situations to be described below are conceivable.

Under a state when the height of the implement relative to the machine body 3 (a detection value of the height sensor 50) is less than a set height, if the stepless variable transmission 7 is moved to the forward traveling side, the front wheel mode is set. If the stepless variable transmission 7 is moved to the reverse traveling side, the rear wheel mode is set.

In case the front wheel mode is set, after the steering angle sensor 47 detects the rear wheels 2 having been steered to the straight traveling positions, the mode switching apparatus 37 is moved to the front wheel steering position 37F. In case the rear wheel mode is set, after the steering angle sensor 46 detects the front wheels 1 having been steered to the straight traveling positions, the mode switching apparatus 37 is moved to the rear wheel steering position 37R.

Under a state when the height of the implement relative to the machine body 3 (a detection value of the height sensor 50) exceeds the set height, irrespectively of the operational position of the stepless variable transmission 7, the four-wheel mode is set. In this case, after the steering angle sensors 46, 47 detect the front wheels 1 and the rear wheels 2 having been steered to the straight traveling positions, the mode switching apparatus 37 is moved to the four-wheel steering position 37A.

As shown in FIGS. 6, 8, 10, 11, 14 and 15, supporting members 52 are bolt-coupled to upper portions of flange portions 27a, 32a of the left and right wheel supporting cases 27, 32. Each supporting member 52 is a plate member bent in the form of an angle. The supporting member 52 on the machine body front side extends from the flange portion 27a toward the left side machine body frame 9 (rear transmission case 6). The supporting member 52 on the machine body rear side extends from the flange portion 32a toward the left side rear transmission case 6.

Figure 11:
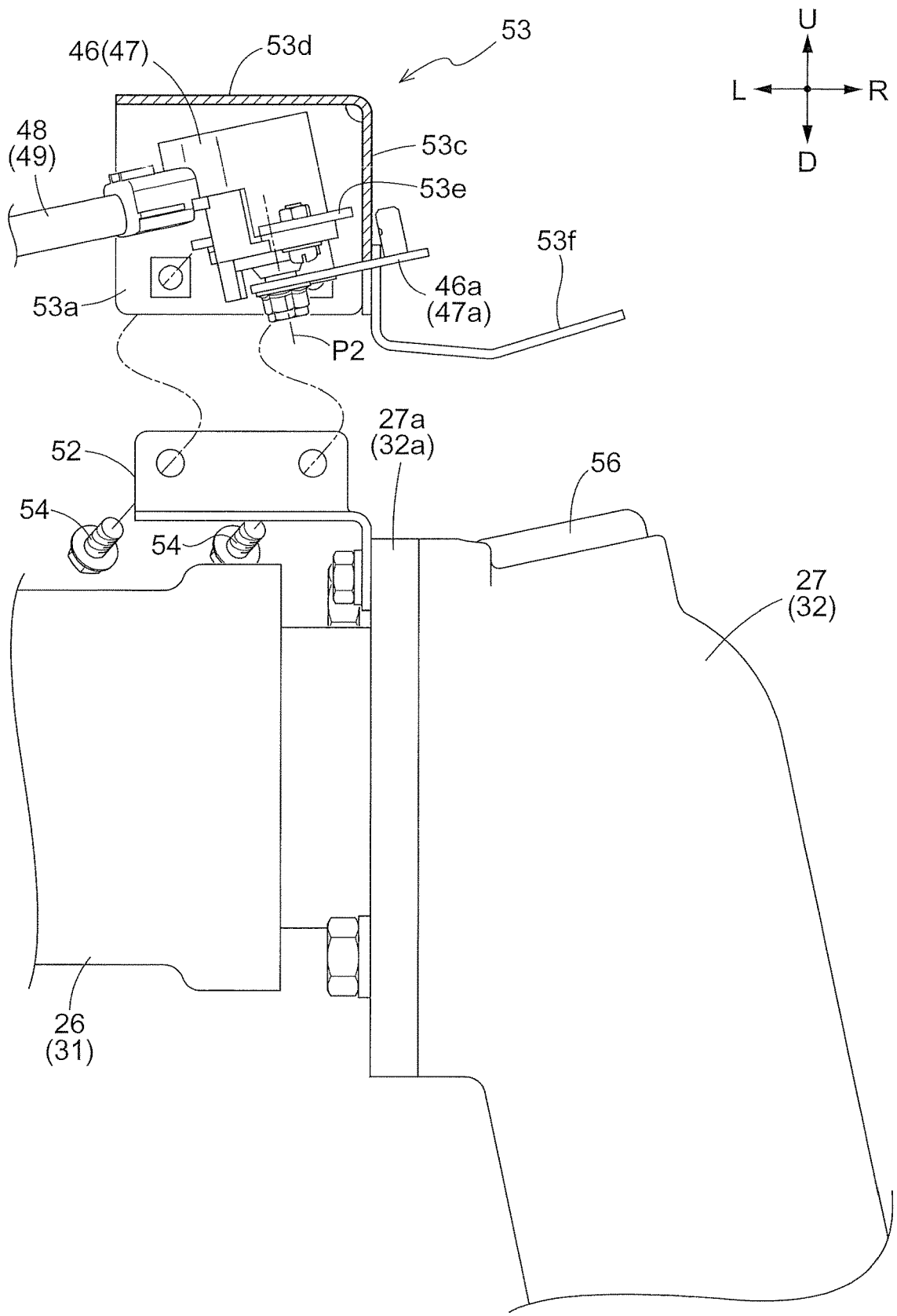
FIG. 11 is a rear view in vertical section showing vicinity of a steering angle sensor and a cover.
Figure 12:
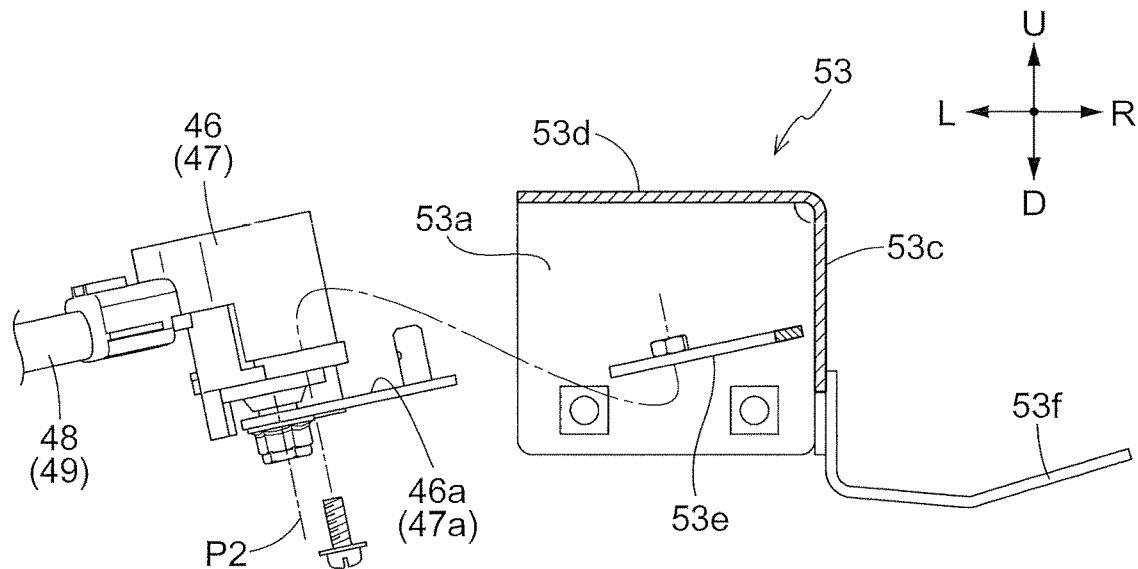
FIG. 12 is a rear view in vertical section showing the steering angle sensor and the cover.
Figure 13:
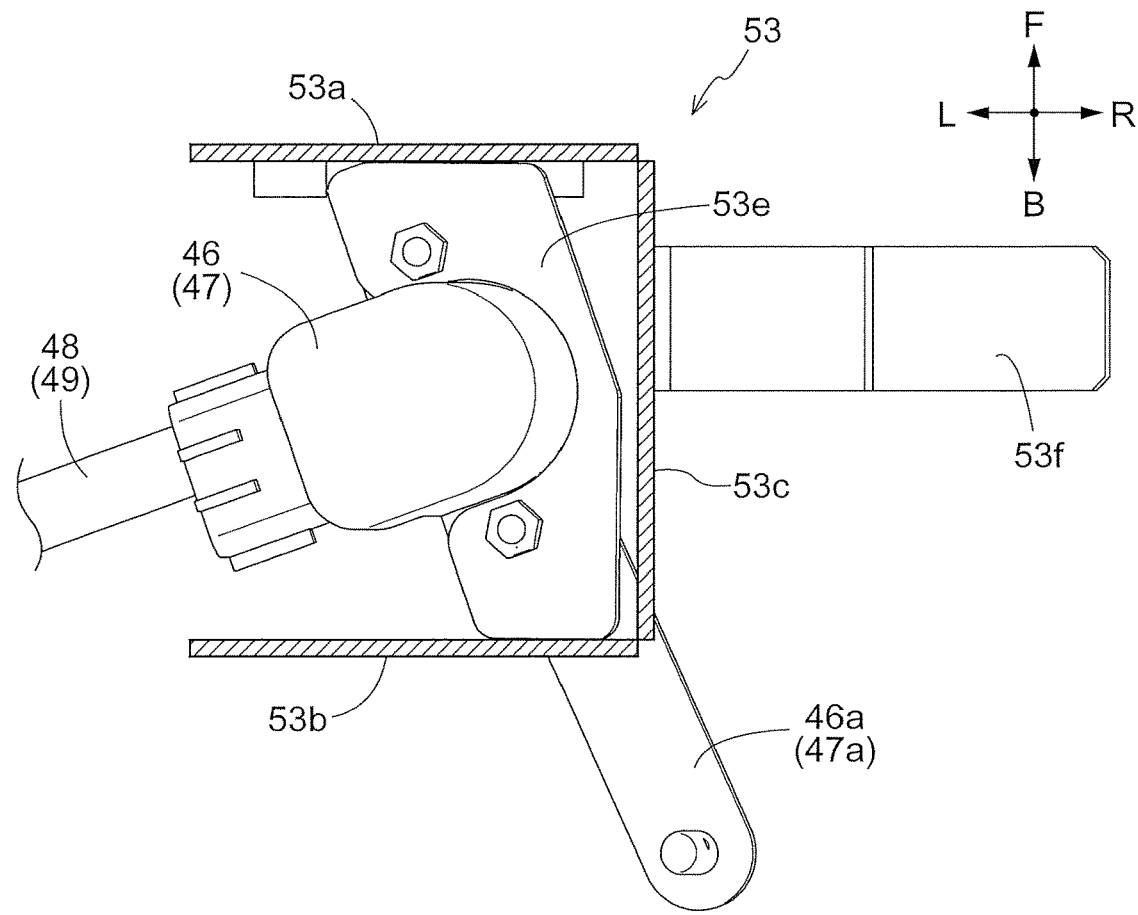
FIG. 13 is a plan view in horizontal section showing the steering angle sensor and the cover.

A cover 53 is detachably coupled to the supporting member 52 via a bolt 54. As shown in FIGS. 11-13, the cover 53 is provided in the form of a box by bending a plate member. The cover 53 includes a front face portion 53a, a rear face portion 53b, a right face portion 53c and an upper face portion 53d. The left portion and the lower portion of the cover 53 are opened.

In the cover 53, a supporting plate 53e is coupled between the front face portion 53a and the rear face portion 53b. The supporting plate 53e defines a recess having a semi-circular shape as seen in the plan view. This recess of the supporting plate 53e is receded to the machine body right side and the opening portion of the recess of the supporting plate 53e is directed toward the left side of the cover 53. A pressing plate 53f is coupled to the right face portion 53c.

The steering angle sensors 46, 47 include potentiometers and include detecting arms 46a, 47a. The detecting arms 46a, 47a are pivotable about an axis P2 (see FIGS. 11 and 12) extending along the vertical direction. The steering angle sensor 46, 47 is inserted to the inside of the cover 53 via the left portion or the lower portion of the cover 53 and inserted to a recess of a supporting plate 53e of the cover 53 to be bolt-coupled to the supporting plate 53e of the cover 53. Under this state, the detecting arm 46a, 47a of the steering angle sensor 46, 47 extends to the rear side through the lower side relative to the lower edge portion of the rear face 53b of the cover 53.

Under the state of the steering angle sensor 46, 47 being attached to the cover 53, as shown in FIGS. 6, 8, 14 and 15, the front face portion 53a of the cover 53 is coupled to the supporting member 52 with bolts 54. A link rod 55 bent in the form of an angle is connected between the detecting arm 46a, 47a and the right wheel supporting cases 28, 33.

With the above arrangement, the steering angle sensor 46 is supported to the right wheel supporting case 27, with the sensor 46 being located upwardly of the front axle case 26 and the right wheel supporting cases 27, 28. Further, the steering angle sensor 47 is supported to the right wheel supporting case 32, with the sensor 47 being located upwardly of the right rear axle case 31 and the right wheel supporting cases 32, 33.

When the front wheels 1 (the right wheel supporting case 28) are steered, this operation is transmitted via the link rod 55. And, the detecting arm 46a of the steering angle sensor 46 is pivotally operated and the steering angle of the front wheels 1 is detected by the steering angle sensor 46.

When the rear wheels 2 (the right wheel supporting case 33) are steered, this operation is transmitted via the link rod 55. And, the detecting arm 47a of the steering angle sensor 47 is pivotally operated and the steering angle of the rear wheels 2 is detected by the steering angle sensor 47.

As shown in FIGS. 6, 8, 14 and 15, an oil filling opening and an oil filling cap 56 are provided at the upper portion of the right wheel supporting cases 27, 32. The oil filling opening is an opening for filling lubricant oil to the transmission shafts (not shown) and the transmission gears (not shown) inside the wheel supporting cases 27, 32. The oil filling cap 56 is attached to the oil filling opening. Under the state of the cover 53 being coupled to the supporting member 52, the pressing plate 53f of the cover 53 is pressed against the oil filling cap 56. With this, loosening of the oil filling cap 56 is prevented.

As shown in FIGS. 5 through 9, the left and right wheel supporting cases 27 are supported to the front axle case 26. The left and right wheel supporting cases 27 are expandable/contractable in the left/right direction. Operational shaft receiving portions 26b are provided at a right portion and a left portion of the right front axle case 26. The operational shaft receiving portions 26b extend to the rear side. Operational shafts 58 are coupled to rear portions of the left and right wheel supporting cases 27. This operational shaft 58 extends toward the machine body frame 9 and is inserted to the operational shaft receiving portion 26b of the front axle case 26.

On the upper face of the operational shaft 58, there are provided rack gear teeth 58a along the longitudinal direction of the operational shaft 58. A pinion gear (not shown) is provided inside the operational shaft receiving portion 26b of the front axle case 26. This pinion gear meshes with rack gear teeth 58a. An expansion/contraction nut 59 is provided at a rear portion of the operational shaft receiving portion 26b of the front axle case 26. A rotational operation of the pinion gear is possible by the expansion/contraction nut 59.

Figure 14:
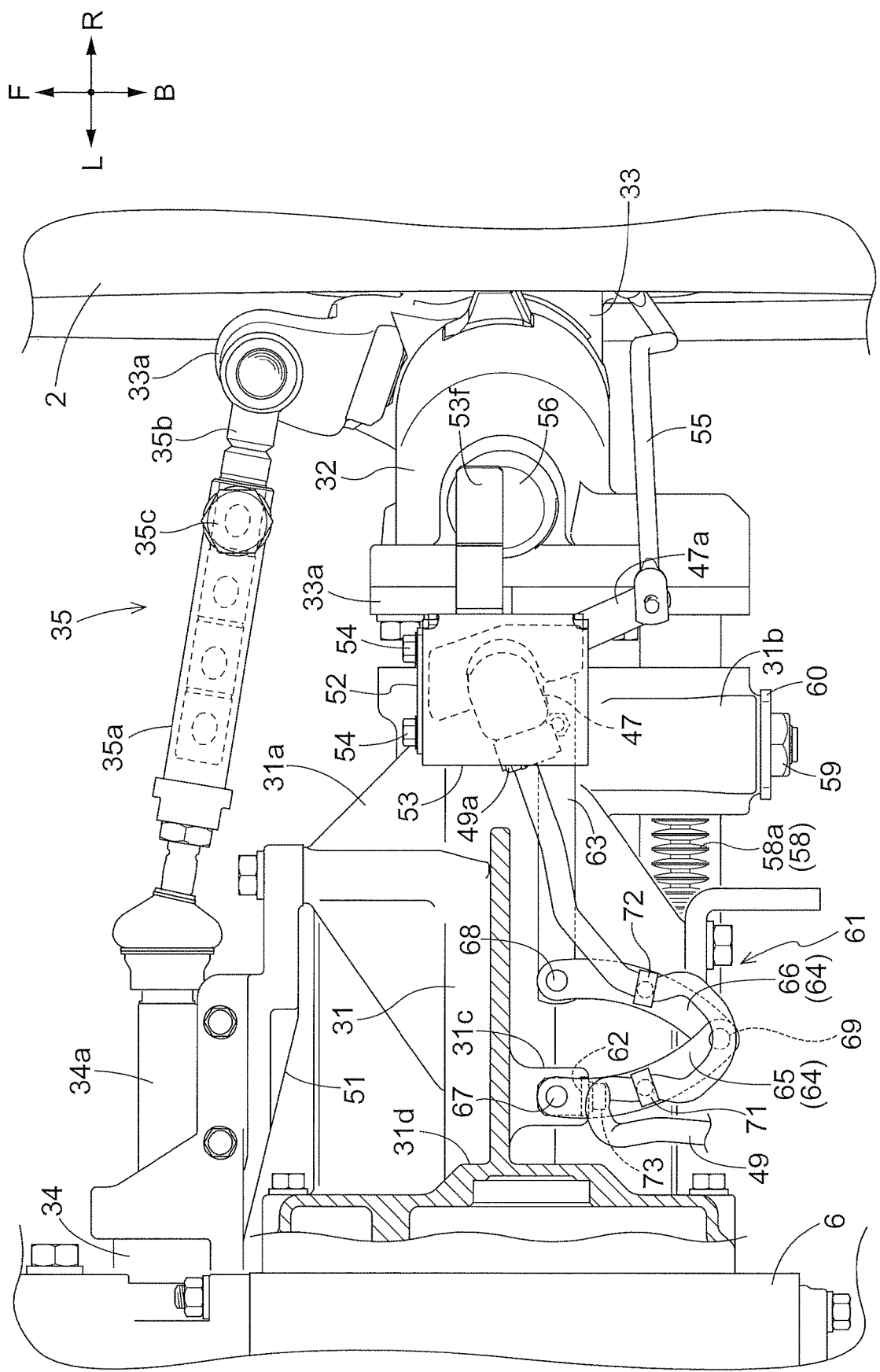
FIG. 14 is a plan view showing vicinity of a wire supporting apparatus at a right rear wheel, showing the state where the link mechanism is bent maximally.
Figure 15:
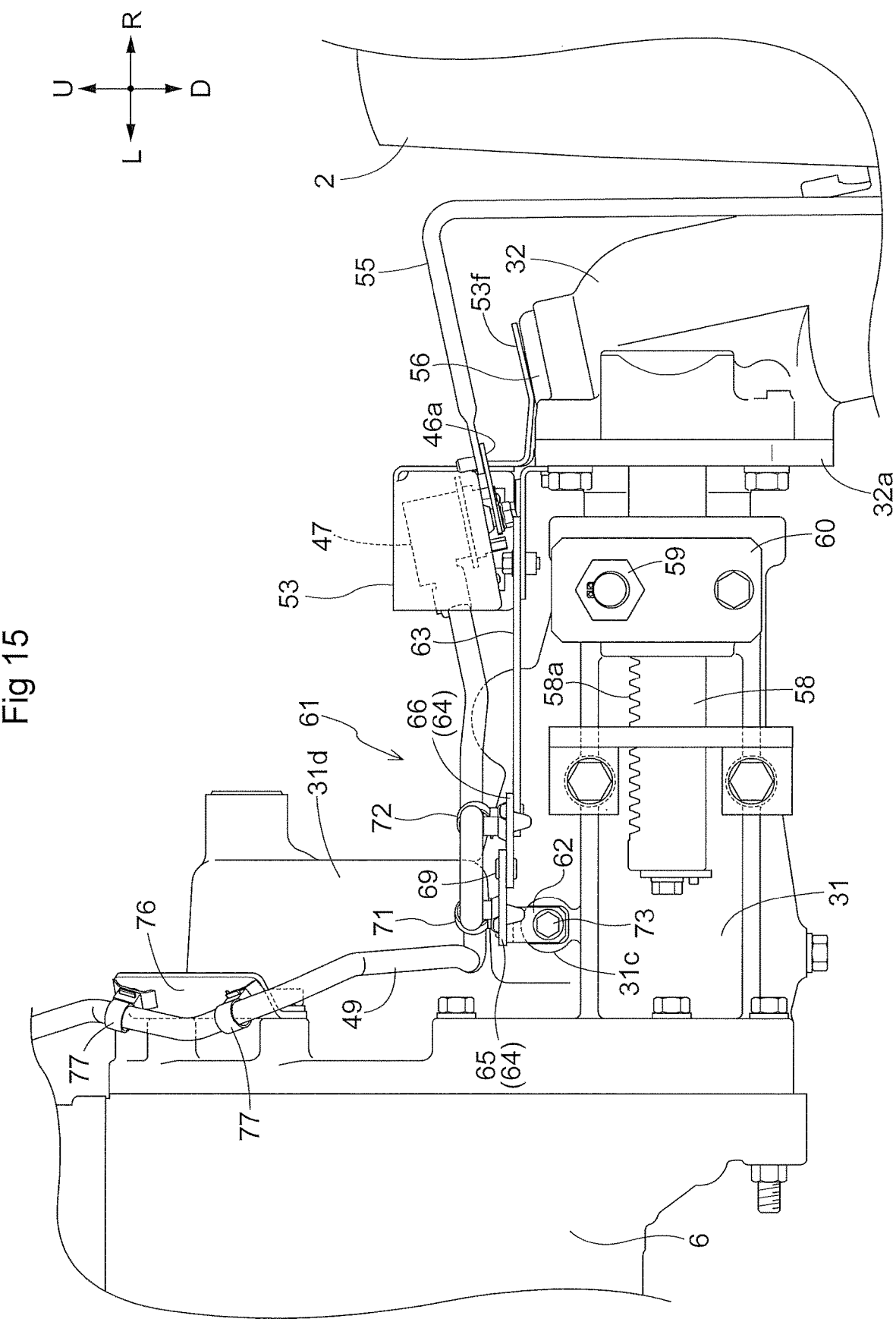
FIG. 15 is a rear view showing vicinity of the wire supporting apparatus at the right rear wheel, showing the state where the link mechanism is bent maximally.

As shown in FIGS. 5, 14 and 15, the left and right wheel supporting cases 32 are supported to the left and right rear axle cases 31. The left and right wheel supporting cases 32 are expandable/contractable in the left/right direction. Operational shaft receiving portions 31b are provided at a right portion and a left portion of the right rear axle case 31. The operational shaft receiving portions 31b extend to the rear side. Operational shafts 58 are coupled to rear portions of the left and right wheel supporting cases 32. This operational shaft 58 extends toward the rear transmission case 6 and is inserted to the operational shaft receiving portions 31b of the left and right rear axle cases 31.

On the upper face of the operational shaft 58, rack gear teeth 58a are provided along the longitudinal direction of the operational shaft 58. A pinion gear (not shown) is provided inside the operational shaft receiving portion 31b of the rear axle case 31. This pinion gear meshes with the rack gear teeth 58a. An expansion/contraction nut 59 is provided at a rear portion of the operational shaft receiving portion 31b of the rear axle case 31. A rotational operation of the pinion gear is possible by the expansion/contraction nut 59.

As shown in FIGS. 6-9, 14 and 15, fixing members 60 are provided on the front axle case 26 and the rear axle case 31, respectively. Each of the fixing member 60 has a same hexagonal hole as the outer shape of the expansion/contraction nut 59. Under a normal state, the expansion/contraction nut 59 is inserted to the hexagonal hole of the fixing member 60. The fixing member 60 is bolt-coupled to the operational shaft receiving portion 26b of the front axle case 26. Also, the fixing member 60 is bolt-coupled to the operational shaft receiving portion 31b of the rear axle case 31. Namely, rotation of the expansion/contraction nut 59 is prevented by the fixing member 60.

As shown in FIGS. 6, 7, 9, 14 and 16, the tie rods 30, 35 include first portions 30a, 35a, second portions 30b, 35b and fixing bolts 30c, 35c with knobs.

The first portions 30a, 35a include pipes and are connected to piston rods 29a, 34a of the steering cylinders 29, 34. The fixing bolts 30c, 35c are attached to the first portions 30a, 35a.

The second portions 30b, 35a are slidably inserted to the first portions 30a, 35a. Further, the second portions 30b, 35b are connected to the knuckle arms 28a, 33a of the wheel supporting cases 28, 33. The second portions 30b, 35b define a plurality of fixing holes and these fixing holes are disposed side by side along the longitudinal direction of the second portions 30b, 35b.

As the fixing bolt 30c, 35c is inserted to one of the fixing holes of the second portion 30b, 35b, the length of the tie rod 30, 35 is fixed.

In case the lengths of the tie rods 30, 35 are to be changed, firstly the fixing bolts 30c, 35c will be withdrawn from the fixing holes of the second portions 30b, 35b. Then, by slidably operating the second portions 30b, 35b, the fixing bolts 30c, 35c are inserted to different fixing holes of the second portions 30b, 35b and fixed. With this, the lengths of the tie rods 30, 35 can be changed.

Operations of changing treads of the front wheels 1 and the rear wheels 2 are carried out as described below.

A worker carries out a stopping operation of the engine 10 and elevates the machine body 3 with a jack (not shown) until the front wheels 1 and the rear wheels 2 are lifted up off the ground surface.

Figure 8:
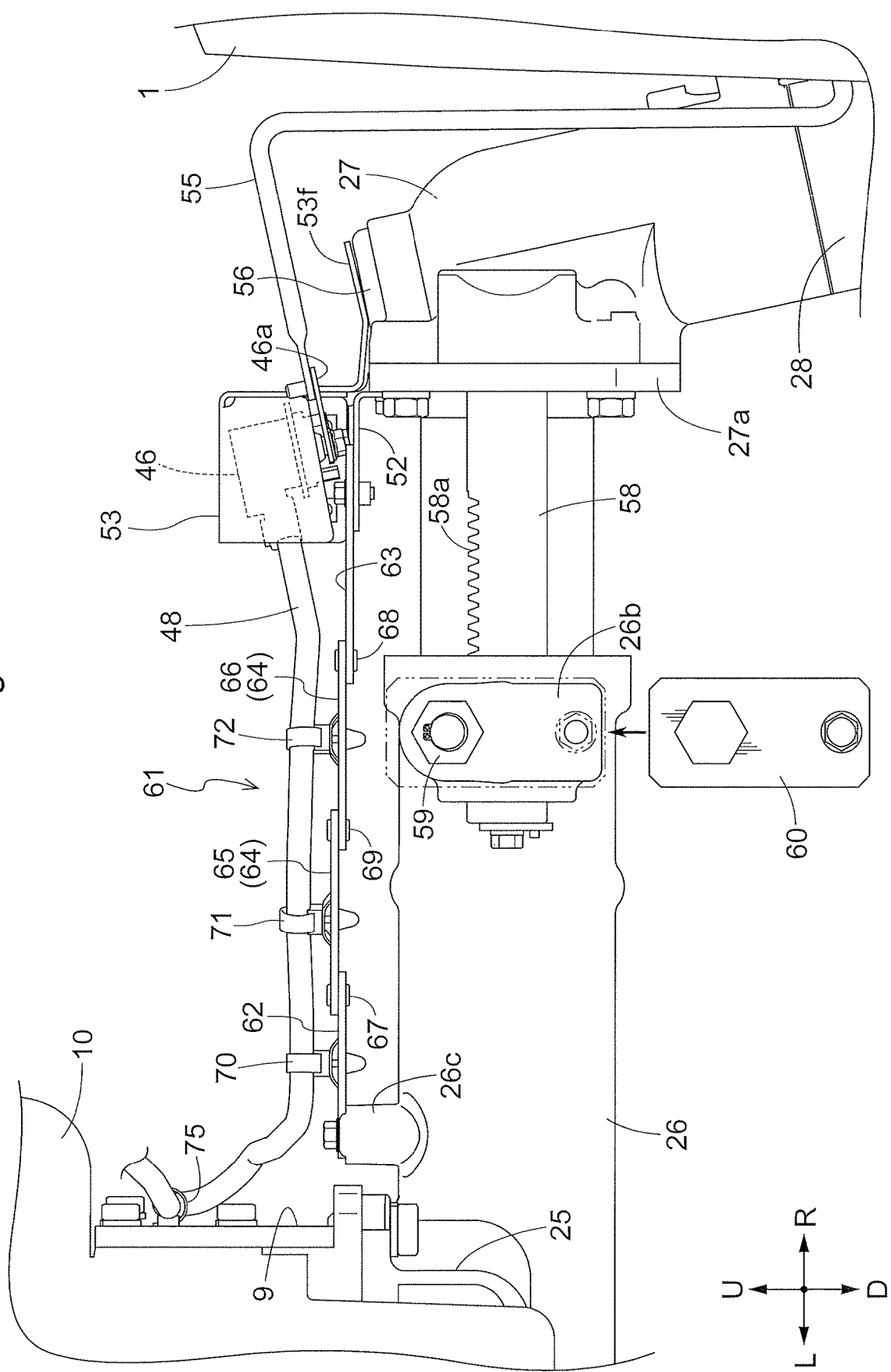
FIG. 8 is a rear view showing vicinity of the wire supporting apparatus at the right front wheel, showing the state where a link mechanism is stretched maximally.

The worker will remove the fixing members 60 shown in FIGS. 8 and 15 from the operational shaft receiving portion 26b of the front axle case 26 and the operational shaft receiving portion 31b of the front axle case 31.

For the tie rods 30, 35 shown in FIGS. 6, 7, 9, 14 and 15, the worker will withdraw the fixing bolts 30c, 35c of the tie rods 30, 35 from the fixing holes of the second portions 30b, 35b of the tie rods 30, 35.

Then, the worker will attach a tool (not shown) to the expansion/contraction nut 59 and rotatably operates this expansion/contraction nut 59 with the tool. In association with the rotational operation of the expansion/contraction nut 59, the pinion gear at the operational shaft receiving portion 26b of the front axle case 26 is pivoted and the operational shaft 58 is slidably operated along the left/right direction. With this, the wheel supporting cases 27, 28 are expanded/contracted relative to the front axle case 26, thus changing the tread of the front wheels 1.

Further, in association with the rotational operation of the expansion/contraction nut 59, the pinion gear at the operational shaft receiving portion 31b of the rear axle case 31 is pivoted and the operational shaft 58 is slidably operated along the left/right direction. With this, the wheel supporting cases 32, 33 are expanded/contracted relative to the rear axle case 31, thus changing the tread of the rear wheels 2.

Thereafter, the worker will bolt-couple the fixing members 60 to the operational shaft receiving portion 26b of the front axle case 26 and the operational shaft receiving portion 31b of the rear axle case 31, thus preventing rotation of the expansion/contraction nut 59 with the fixing members 60. Further, the worker will change the lengths of the tie rods 30, 35 in accordance with the changes of the treads of the front wheels 1 and the rear wheels 2.

As shown in FIGS. 6-10, there is provided a wire supporting apparatus 61 to support the harness 48 for the front wheels 1. The wire supporting apparatus 61 includes a link mechanism 64, connecting pins 67, 68, 69, clamps 70, 71, 72, and so on. The connecting pins 67, 68, 69 correspond to "hinge portions" and the clamps 71, 72 correspond to a "supporting mechanism". The link mechanism 64 includes supporting members 62, 63 and link members 65, 66.

The supporting member 62 includes a plate member in the form of a flat plate. At an upper portion of the front axle case 26, a seat portion 26c extends upwards and a counterbore in the form of a recess is provided at the seat portion 26c. When the supporting member 62 is attached to the seat portion 26c (recess) of the front axle case 26. The supporting member 62 is fixed by a single bolt 73, thus being prevented from rotation of the supporting member 62.

The supporting member 63 includes a plate member in the form of a flat plate. The supporting member 63 is coupled to the supporting member 52 with a single bolt 74 and rotation of the supporting member 63 is prevented by a half piercing work in a convex form. The supporting members 62, 63 are disposed to be aligned along a single straight line along the left/right direction as seen in the plan view.

The link member 65 includes a plate member in the form of a flat plate having an arcuate shape as seen in the plan view. The link member 65 is connected to an end portion of the supporting member 62. The link member 65 is pivotable by the connecting pin 67 by an axis extending along the vertical direction.

The link member 66 includes a plate member in the form of a flat plate having an arcuate shape as seen in the plan view. The link member 66 is connected to an end portion of the supporting member 63. The link member 66 is pivotable by the connecting pin 68 by an axis extending along the vertical direction. End portions of the link members 65, 66 are connected via a connecting pin 69 to be pivotable along the axis extending along the vertical direction.

The clamp 70 is attached in an upward orientation to a face portion of the supporting member 62 located between the bolt 73 and the connecting pin 67. The clamp 70 is rotatable about an axis extending along the vertical direction.

The clamp 71 is attached under an upward orientation to a face portion of the link member 65 located between the connecting pin 67 and the connecting pin 69. The clamp 71 is rotatable about an axis extending along the vertical direction.

The clamp 72 is attached under an upward orientation to a face portion of the link member 66 located between the connecting pin 68 and the connecting pin 69. The clamp 72 is rotatable about an axis extending along the vertical direction.

With the above-described arrangements, the wire supporting apparatus 61 is disposed on the right outer side relative to the machine body frame 9. The link mechanism 64 (link members 65, 66) is disposed upwardly of the front axle case 26 and the right wheel supporting cases 27, 28 and provided between the front axle case 26 and the wheel supporting cases 27, 28.

The link mechanism 64 (link members 65, 66) is expandable/contractable in association with stretching/bending of the front axle case 26 and the right wheel supporting cases 27, 28. Namely, in operative association with telescopic expansion/contraction of the front axle case 26 and the right wheel supporting cases 27, 28, the link mechanism 64 (link members 65, 66) effects a bending/stretching motion to the rear side along the horizontal plane.

Figure 16:
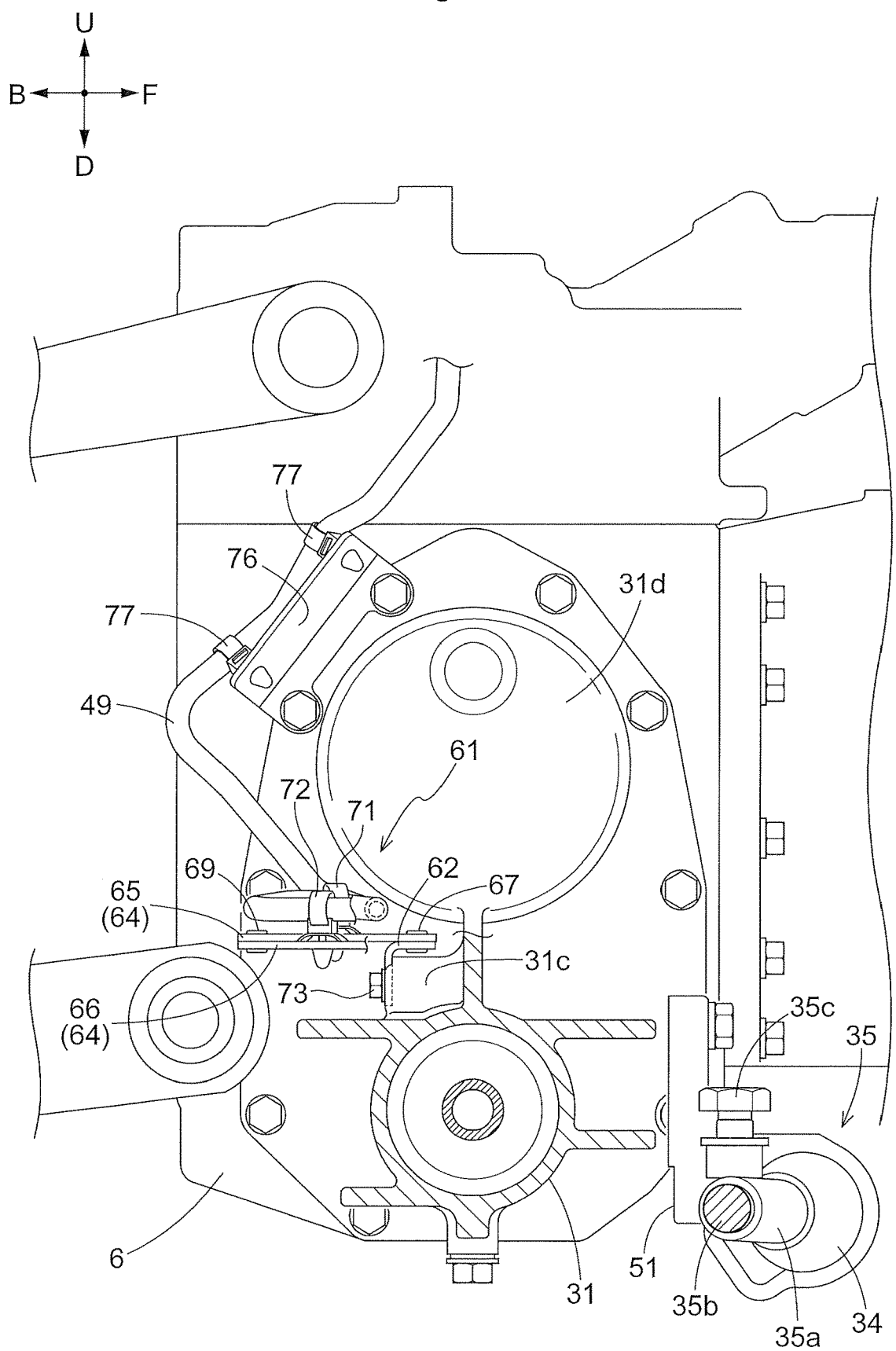
FIG. 16 is a right side view in vertical section showing vicinity of the wire supporting apparatus at the right rear wheel, showing the state where the link mechanism is bent maximally.

As shown in FIGS. 14-16, there is provided a wire supporting apparatus 61 to support the harness 49 for the rear wheels 2. The wire supporting apparatus 61 includes a link mechanism 64, connecting pins 67, 68, 64, clamps 71,72, etc. The link mechanism 64 includes a supporting member 63, and link members 65, 66. The supporting member 63 and the link members 65, 66 shown in FIGS. 14-16 are of the same arrangements as those of the supporting member 63 and the link members 65, 66 included in the wire supporting apparatus 61 to support the harness 48 for the front wheels 1. The wire supporting apparatus 61 shown in FIGS. 14-16 has a similar arrangement to the wire supporting apparatus 61 to support the harness 48 for the front wheels 1, but the shape of the supporting member 62 differs from the supporting member 62 shown in FIGS. 6-10.

The supporting member 62 shown in FIGS. 14-16 includes a plate member in the form of a flat plate and formed like an angle. At an upper portion of the right rear axle case 31, a seat portion 31c is formed rearwards, and a counterbore in the form of a recess is provided at this seat portion 31c. When the supporting member 62 is attached to the seat portion 31c (recess) of the right rear axle case 31. The supporting member 62 is fixed by a single bolt 73, thus being prevented from rotation of the supporting member 62.

With the above-described arrangements, the wire supporting apparatus 61 is disposed on the right outer side relative to the rear transmission case 6. The link mechanism 64 (link members 65, 66) is disposed upwardly of the right rear axle case 31 and the right wheel supporting cases 32, 33 and provided between the right rear axle case 31 and the right wheel supporting cases 32, 33.

The link mechanism 64 (link members 65, 66) is expandable/contractable in association with stretching/bending of the right rear axle case 31 and the right wheel supporting cases 32, 33. Namely, in operative association with telescopic expansion/contraction of the right rear axle case 31 and the right wheel supporting cases 32, 33, the link mechanism 64 (link members 65, 66) effects a bending/stretching motion to the rear side along the horizontal plane.

At an upper portion of the base of the right rear axle case 31, a brake accommodating portion 31d is provided. The brake accommodating portion 31d extends to the right outer side. In this brake accommodating portion 31d, a right brake (not shown) is accommodated. In response to a stepping operation on a right brake pedal 23 (see FIGS. 1-3), the right brake brakes the right rear wheel 2.

At an upper portion of the base of the left rear axle case 31, a brake accommodating portion 31d is provided. The brake accommodating portion 31d extends to the left outer side. In this brake accommodating portion 31d, a left brake (not shown) is accommodated. In response to a stepping operation on a left brake pedal 23 (see FIGS. 2 and 3), the left brake brakes the left rear wheel 2. In the wire supporting apparatus 61, the supporting member 62 and the link mechanism 64 (link member 65) shown in FIGS. 14-16 are disposed between the main body of the right axle case 31 and the brake accommodating portion 31d.

As described above, the harness 48 extends from the controller 45 of the machine body 3. As shown in FIGS. 6-10, the harness 48 extends to the right outer side of the right machine body frame 9 and is fixed in position to a right outer face portion of the right machine body frame 9 by the clamp 75.

The harness 48 extends forwardly from the position of the clamp 75 and further extends therefrom with 180 degree change in its direction to the rear side. And, the harness 48 is fixed in position by the clamp 70 to the face portion of the supporting member 62 between the bolt 73 and the connecting pin 67 so as to extend along the face portion of the supporting member 62. With this arrangement, the harness 48 is supported so as not to enter the gap between the machine body frame 9 and the front axle case 26.

The harness 48 is fixed in position by the clamp 71 to a face portion of the link member 65 between the connecting pin 67 and the connecting pin 69 so as to extend along the face portion of the link member 65. The harness 48 is fixed in position by the clamp 72 to a face portion of the link member 66 between the connecting pin 68 and the connecting pin 69 so as to extend along the face portion of the link member 65. A coupler 48a of the harness 48 is connected to the steering angle sensor 46.

Thus, the harness 48 is supported to the link mechanism (link members 65, 66) and the supporting member 62 via the clamps 70, 71, 72. The link mechanism 64 (link members 65, 66) and the supporting member 62 are disposed downwardly of the harness 48.

As described above, the harness 49 extends from the controller 45 of the machine body 3. As shown in FIGS. 14-16, the harness 49 extends to the upper side of the brake accommodating portion 31d of the right rear axle case 31. A supporting member 76 in the form of an angle is coupled to the rear transmission case 6 together with the right rear axle case 31. The clamp 77 is attached to the supporting member 76.

The harness 49 is fixed in position to the supporting member 76 by the clamp 77. The harness 49 extends to circumvent the rear portion of the brake accommodating portion 31d of the right rear axle case 31 to extend between the body of the right rear axle case 31 and the brake accommodating portion 31d.

The clamp 70 is not provided for the supporting member 62. The harness 49, like the harness 48, is fixed in position to the link member 65 by the clamp 71 and fixed in position to the link member 66 by the clamp 72. A coupler 49a of the harness 49 is connected to the steering angle sensor 47.

Thus, the harness 49 is supported to the link mechanism 64 (link members 65, 66) with the clamps 71, 72. The link mechanism 64 (link members 65, 66) is disposed downwardly of the harness 49.

Next, a state when the wire supporting apparatus 61 for the harness 48 for the front wheels 1 is maximally bent will be explained. Incidentally, under this state of the link mechanism 64 (link members 65, 66) being bent maximally, the wire supporting apparatus 61 for the harness 48 for the front wheels 1 and the wire supporting apparatus 61 for the harness 49 for the rear wheels 2 assume a same state. For this reason, explanation about the state of the wire supporting apparatus 61 of the harness 49 for the rear wheels 2 being bent maximally will be omitted.

Figure 6:
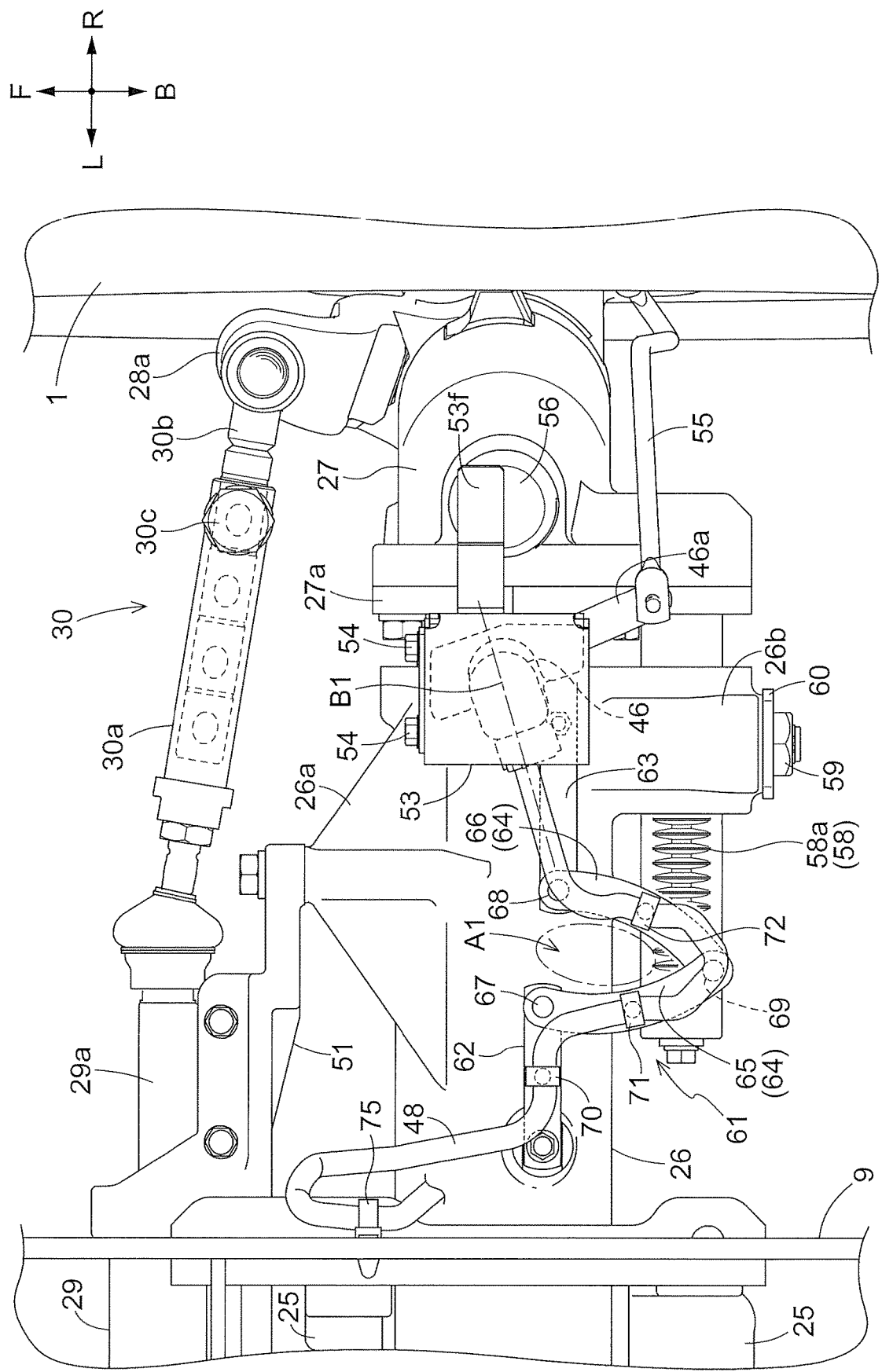
FIG. 6 is a plan view showing vicinity of a wire supporting apparatus at a right front wheel, showing a state where a link mechanism is bent maximally.
Figure 9:
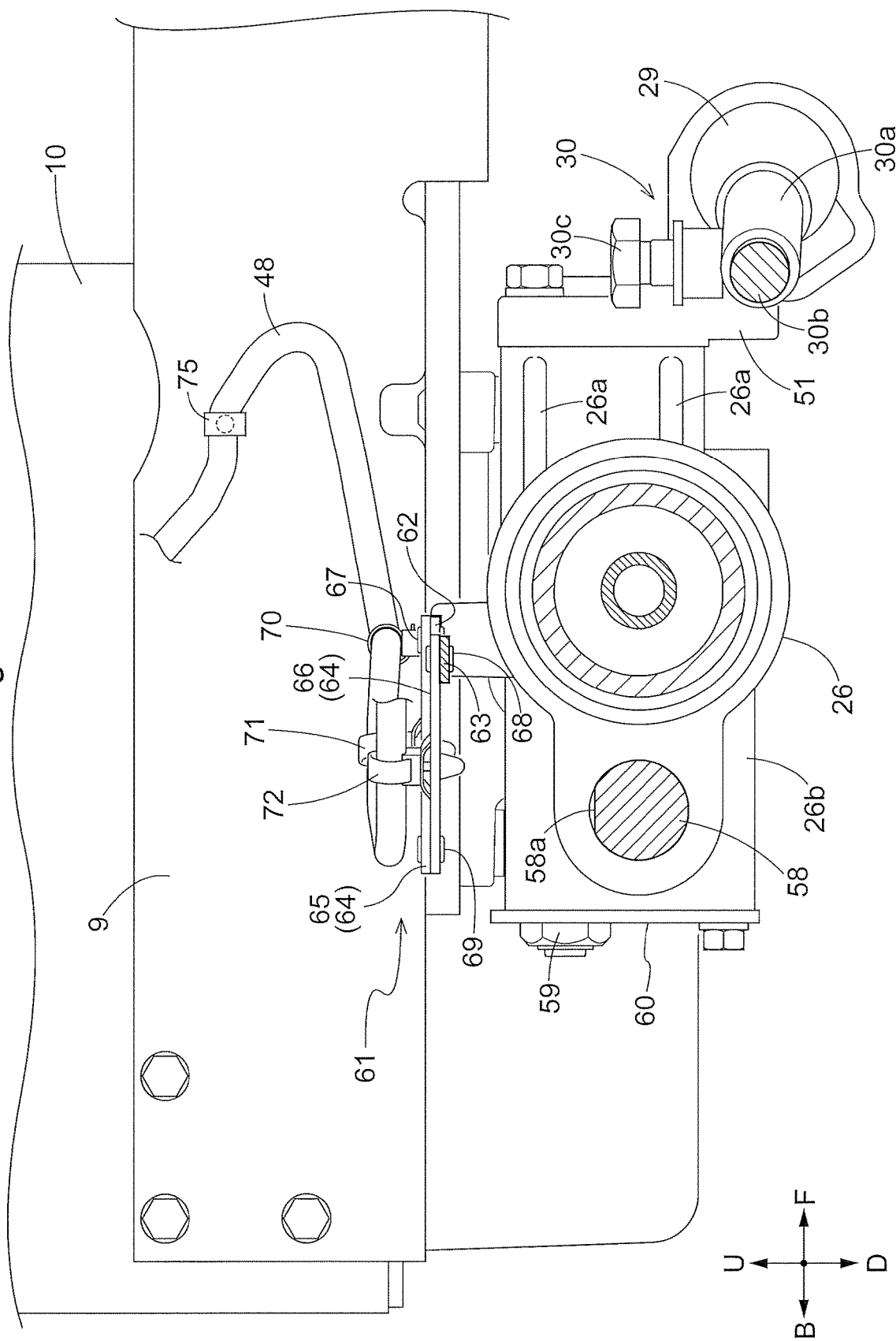
FIG. 9 is a right side view in vertical section showing the vicinity of the wire supporting apparatus at the right front wheel. showing the state where the link mechanism is bent maximally.
Figure 10:
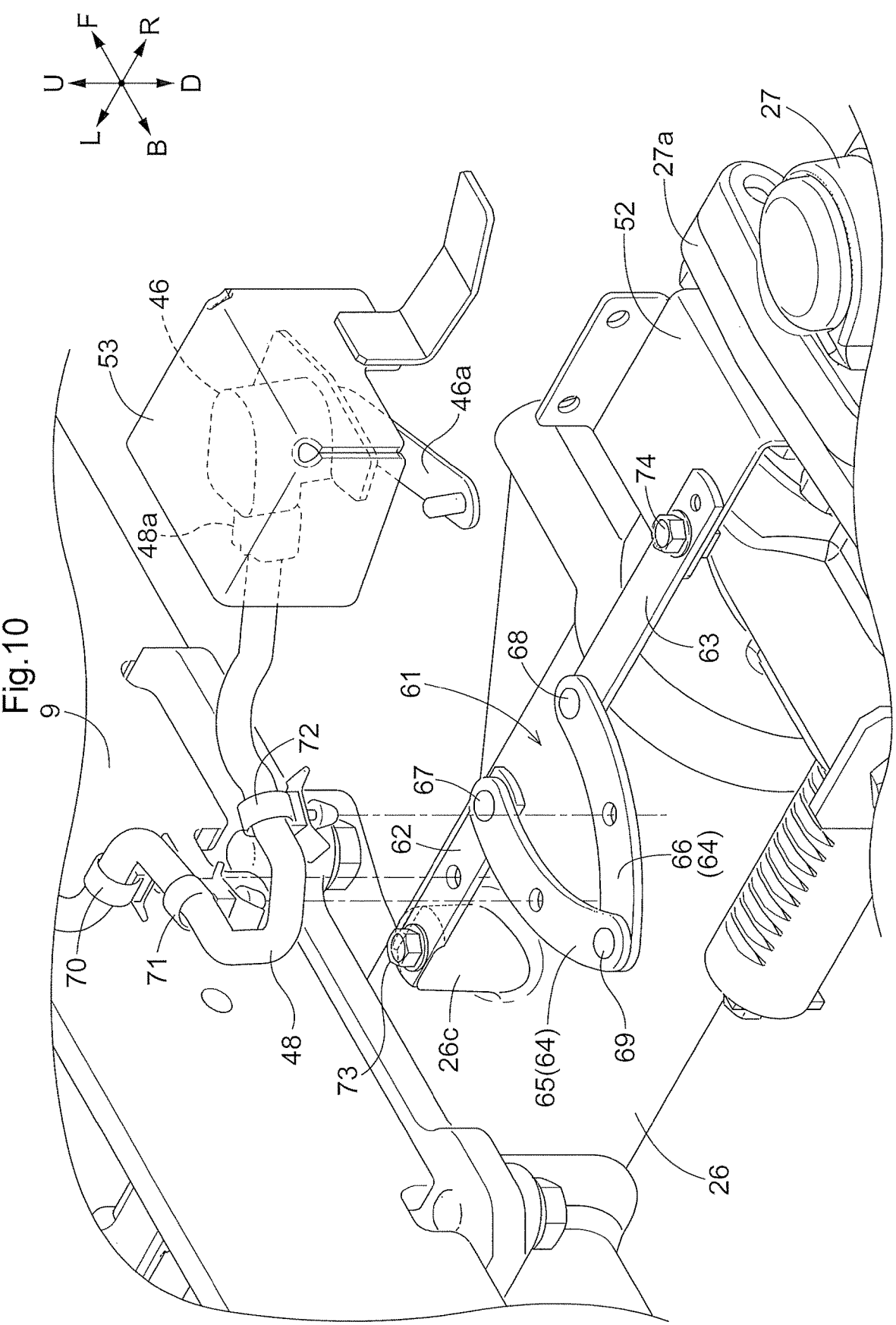
FIG. 10 is an exploded perspective view showing the vicinity of the wire supporting apparatus at the right front wheel, showing the state where the link mechanism is bent maximally.

FIGS. 6, 9 and 10 show a situation in which the wheel supporting cases 27, 28 are located nearest the front axle case 26. In this situation, the tread of the front wheels 1 is narrowest and in the wire supporting apparatus 61, the link mechanism 64 (link members 65, 66) is bent maximally.

The supporting members 62, 63 are disposed upwardly of the front axle case 26 and the right wheel supporting cases 27, 28 so as to be overlapped with the front axle case 26 and the right wheel supporting cases 27, 28 as seen in the plan view.

The link mechanism 64 (link members 65, 66) is bent rearwards so as to depart from the front axle case 26 as seen in the plan view. In this, the operational shaft 58 has entered the lower side of the link mechanism 64 (link members 65, 66), and the link mechanism 64 (link members 65, 66) and the operational shaft 58 are overlapped with each other as seen in the plan view.

The link members 65, 66 have actuate shapes as seen in the plan view and the inner edges of the link members 65, 66 are formed as curves bulging to the outer side. The end portion of the supporting member 62 and the end portion of the supporting member 63 are slightly spaced away from each other in the left/right direction. With this, a gap A1 is provided between the adjacent link members 65, 66 when the link mechanism 64 (link members 65, 66) is maximally bent.

The harness 48 is fixed in position to the supporting member 62 and the link members 65, 66 with the clamps 70, 71, 72. With this, the harness 48 is located closest to the connecting pins 67, 68, 69 of the link members 65, 66.

Next, a state when the wire supporting apparatus 61 for the harness 48 for the front wheels 1 is maximally stretched will be explained. Incidentally, under this state of the link mechanism (link members 65, 66) being stretched maximally, the wire supporting apparatus 61 for the harness 48 for the front wheels 1 and the wire supporting apparatus 61 for the harness 49 for the rear wheels 2 assume a same state. For this reason, explanation about the state of the wire supporting apparatus 61 of the harness 49 for the rear wheels 2 being maximally stretched will be omitted.

Figure 7:
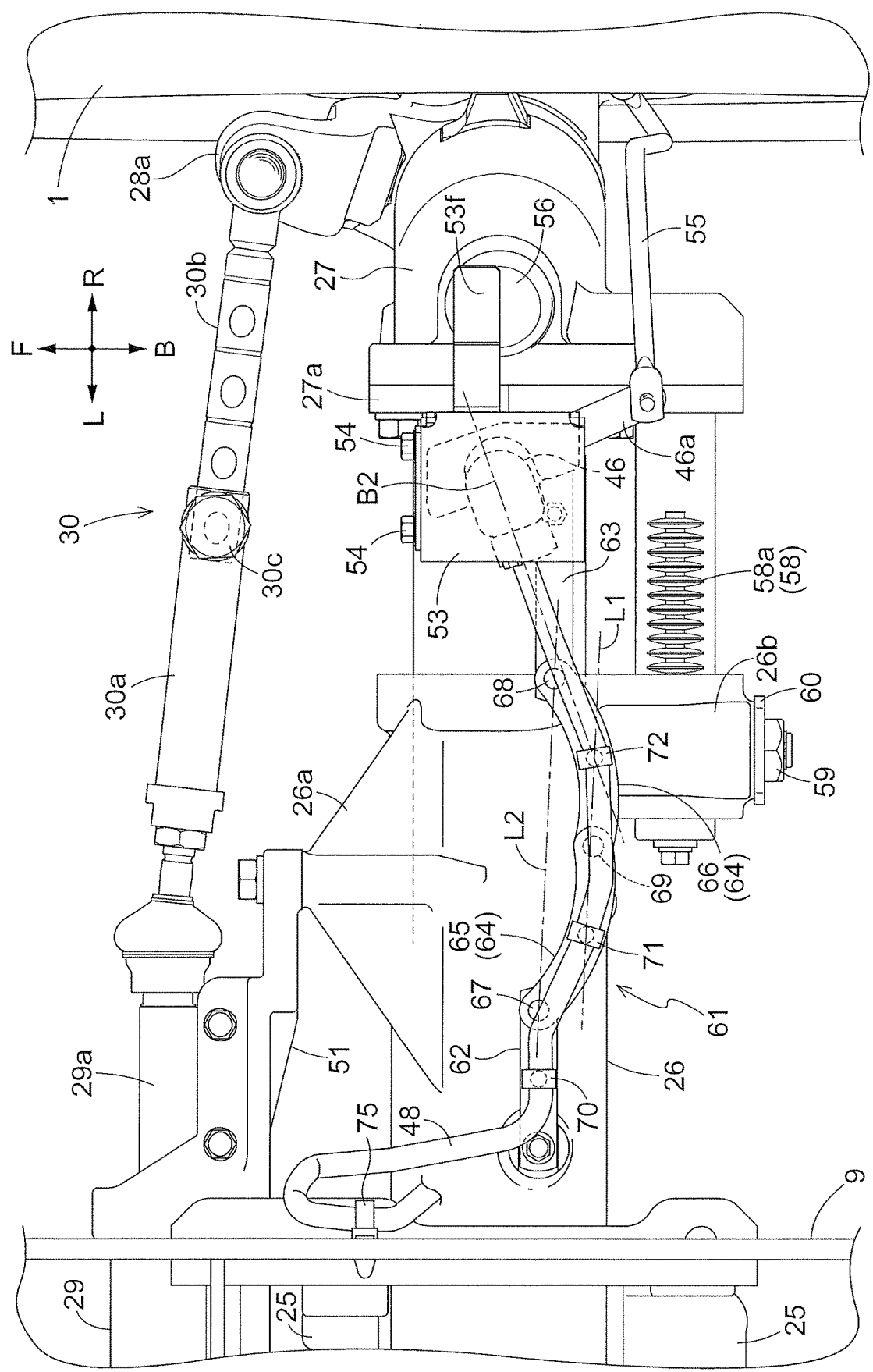
FIG. 7 is a plan view showing the vicinity of the wire supporting apparatus at the right front wheel, showing a state where the link mechanism is stretched maximally.

FIGS. 7 and 8 show a situation in which the wheel supporting cases 27, 28 are located farthest from the front axle case 26. In this situation, the tread of the front wheels 1 is widest and in the wire supporting apparatus 61, the link mechanism (link members 65, 66) is stretched maximally.

The supporting members 62, 63 are disposed upwardly of the front axle case 26 and the right wheel supporting cases 27, 28 so as to be overlapped with the front axle case 26 and the right wheel supporting cases 27, 28 as seen in the plan view.

The connecting pin 69 of the link members 65, 66 and the clamps 71, 72 are disposed side by side along (or substantially along) a single straight line along a virtual straight line L1 as seen in a plan view. The clamps 71, 72 are portions where the harness 48 is fixed in position to the link members 65, 66.

As described above, the harness 48 is fixed in position to the supporting member 62 and the link members 65, 66 with the clamps 70, 71, 72. For this reason, the harness 48 shown in FIG. 7 and FIG. 8 defines an approximately straight line along the virtual straight line L1. In this case too, the harness 48 is located closest to the connecting pins 67, 68, 69 of the link members 65, 66.

The supporting member 63 is disposed on a slightly rear side relative to the supporting member 62. For this reason, when there is assumed a virtual straight line L2 extending through the connecting pins 67, 68, this virtual straight line L2 is inclined slightly relative to the left/right direction as seen in the plan view. The virtual straight line L1 is located slightly on the rear side relative to the virtual straight line L2 and approximately parallel with this virtual straight line L2. Thus, the virtual straight line L1 is slightly inclined relative to the left/right direction, like the virtual straight line L2.

With the above arrangements, when the link mechanism 64 (link members 65, 66) shifts from its stretched state to its bent state (see FIG. 6), the link mechanism 64 (link members 65, 66) is not bent forwards, but bent rearwards.

As described above, in the wire supporting apparatus 61, the link mechanism 64 (link members 65, 66) effects a bending/stretching motion between the maximally bent state (see FIG. 6 and FIG. 14) and the maximally stretched state (see FIG. 7), in operative association with the telescopic expansion/contraction of the front axle case 26 (rear axle case 31) and the wheel supporting cases 27, 28, 32, 33.

The clamps 70, 71, 72 support the harnesses 48, 49 to the link mechanism 64 (link members 65, 66). Therefore, the harnesses 48, 49 are deformed while maintaining their states of following the shape of the link mechanism 64 (link members 65, 66), in operative association with the bending/stretching motion of the link mechanism 64 (link members 65, 66).

As shown in FIGS. 6 and 7, the portion between the coupler 48a of the harness 48 and the clamp 72 is the connecting portion of the harness 48 to the steering angle sensor 46. When this connecting portion of the harness 48 to the steering angle sensor 46 is focused on, under the state when the link mechanism (link members 65, 66) is bent maximally (see FIG. 6), the connecting portion is located along the position B1 as seen in the plan view. Under the state when the link mechanism 64 (link members 65, 66) is maximally stretched (see FIG. 7), the connecting portion is located along the position B2 as seen in the plan view.

The connecting portion of the harness 48 to the steering angle sensor 46 is pivoted between the position B1 and the position B2 in association with the bending/stretching motion of the link mechanism 64 (link members 65, 66).

In this case, the angle between the position B1 and the position B2 is the pivot angle of the connecting portion of the harness 48 to the steering angle sensor 46. Namely, of the position fixing portions of the harness 48 by the clamps 70, 71, 72, the position fixing portion of the clamp 72 closest to the steering angle sensor 46 is set so that the pivot angle of the connecting portion of the harness 48 to the steering angle sensor 46 will not exceed a predetermined angle.

For the rear wheels 2 similarly, of the position fixing portions of the harness 49 by the clamps 71, 72, the position fixing portion of the clamp 72 closest to the steering angle sensor 47 is set so that the pivot angle of the connecting portion of the harness 49 to the steering angle sensor 47 will not exceed a predetermined angle.

First Modified Preferred Embodiment of Present Invention

Not in a four-wheel steering tractor, but in a four-wheel drive tractor configured such that the front wheels 1 are steered while the rear wheels 2 are fixed at the straight traveling positions, the steering angle sensor 46 and the wire supporting apparatus 61 may be used in a manner described below.

In this tractor, a front wheel speed changer (not shown) is provided in the transmission system transmitting power to the front wheels 1. The front wheel speed changer is capable of speed changing to a standard position at which the front wheels 1 are driven at a same speed as the rear wheels 2 and an accelerated position at which the front wheels 1 are driven at a higher speed than the rear wheels 2.

The steering angle sensor 46 is provided in the front wheel 1 and a steering angle of the front wheel 1 is inputted to the controller 45. Based on a detection value of the steering angle sensor 46, if it is determined that the front wheel 1 is located within a predetermined left/right angle range, then, the front wheel speed changer is set to the standard position by the controller 45. Whereas, if the front wheel 1 is steered to the right (left) side beyond the predetermined angle, then, the front wheel speed changer is set to the accelerated position by the controller 45.

Second Modified Preferred Embodiment of Present Invention

The steering angle sensors 46, 47 and the wire supporting apparatus 61 may be provided for the left front wheel 1 and for the left rear wheel 2, respectively. Alternatively, the steering angle sensor 46 and the wire supporting apparatus 61 may be provided for the right front wheel 1 and the steering angle sensor 47 and the wire supporting apparatus 61 may be provided for the left rear wheel 2. Further alternatively, the steering angle sensor 46 and the wire supporting apparatus 61 may be provided for the left front wheel 1 and the steering angle sensor 47 and the wire supporting apparatus 61 may be provided for the right rear wheel 2.

Third Modified Preferred Embodiment of Present Invention

In the wire supporting apparatus 61, the link mechanism (link members 65, 66) may be bent/stretched along a plane inclined slightly upwards relative to the horizontal plane or a plane inclined slightly downwards relative to the horizontal plane. Alternatively, the link mechanism 64 (link members 65, 66) may be bent/stretched forwardly or bent/stretched upwardly or downwardly.

Fourth Modified Preferred Embodiment of Present Invention

In the wire supporting apparatus 61, the link members 65, 66 may have a shape of a bent straight line, rather than the arcuate shape, and the inner edges of the link members 65, 66 may have an outwardly bulging bent shape. Further alternatively, the outer edges of the link members 65, 66 may be straight and the inner edges of the link members 65, 66 may be curved or bent and bulging outwards.

Fifth Modified Preferred Embodiment of Present Invention

In the wire supporting apparatus 61, the link mechanism 64 may include three or more link members 65, 66. Rather than providing one clamp 71, 72 for one link member 65, 66, a plurality of clamps 71, 72 may be provided for one link member 65, 66.

Sixth Modified Preferred Embodiment of Present Invention

A case is conceivable in which the tread is rendered changeable not in a work vehicle such as a four-wheel tractor or the like, but a multiple-wheel work vehicle such as a transporter vehicle having left and right traveling apparatuses configured such that its wheels for traveling are driven, but not steered. In this case, in addition to the steering angle sensors 46, 47 or instead of the steering angle sensors 46, 47, rotation speed sensors to detect rotation speeds of the wheels of the left and right traveling apparatuses may be used as the "second device". In case there is included an in-wheel electric motor to drive the wheel of the traveling apparatus, this electric motor may be used as the "second device".

Seventh Modified Preferred Embodiment of Present Invention

In the wire supporting apparatus 61, as the "first device", a monitor, a data storage device, etc. may be used. And, as the "second device", a camera, a sound collecting microphone, a vicinity sensor or an infrared sensor, a laser device, an operational switch operable by a worker, etc. may be used.

Eighth Modified Preferred Embodiment of Present Invention

In the wire supporting apparatus 61, as the "first device", a pump to supply fluid such as work oil, water, etc. may be used. As the "second device", a fluid motor operable by fluid, a tank for reserving fluid, etc. may be used. In this case, as the "wire", a flexible hose for supplying the fluid, etc. may be used.

Preferred embodiments of the present invention are applicable to wire supporting apparatuses to support a flexible wire and applicable also to work vehicles including such wire supporting apparatuses.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A work vehicle comprising:
a wire supporting apparatus including:
a link mechanism provided between a first member and a second member to effect a bending/stretching motion in operative association with a telescopic expanding/contracting motion of the first member and the second member; and
a supporting mechanism to support, to the link mechanism, a wire having flexibility and connected between a first device on a side of the first member and a second device on a side of the second member; wherein
the first member includes a first wheel supporting member supported to a machine body;
the second member includes a second wheel supporting member supported to the first wheel supporting member to be expandable/contractable along a left/right direction and supporting a traveling wheel; and
the supporting mechanism supports the wire to the link mechanism and fixes the wire in position to each link member of the link mechanism so that the wire is deformed while maintaining its state following a shape of the link mechanism in operative association with the bending/stretching motion of the link mechanism.

2. The work vehicle of claim 1, wherein the link mechanism is disposed upwardly of the first wheel supporting member and the second wheel supporting member and is bent/stretched along the horizontal plane in association with expansion/contraction of the second wheel supporting member.

3. The work vehicle of claim 2, wherein the link mechanism is disposed downwardly of the wire.

4. The work vehicle of claim 1, wherein
the work vehicle further comprises a machine body frame disposed along a front/rear direction;
the first wheel supporting member is supported to a lower portion of the machine body frame to be capable of rolling about an axis extending along the front/rear direction, the first wheel supporting member protruding laterally outwards from the machine body frame;
the second wheel supporting member is supported to a portion of the first wheel supporting member protruding laterally outwards from the machine body frame to be expandable/contractable; and
the wire supporting apparatus is disposed on a laterally outer side of the machine body frame.

5. The work vehicle of claim 1, wherein
the first device includes a controller supported to the machine body;
the second device includes a steering angle sensor included in the second wheel supporting member and capable of detecting a steering angle of the wheel;
the wire includes a harness having flexibility and connected to/between the controller and the steering angle sensor; and
of position fixing portions of the harness by the supporting mechanism, a position closest to the steering angle sensor is set such that when a connecting portion of the harness to the steering angle sensor is pivoted relative to the steering angle sensor in association with the bending/stretching motion of the link mechanism, the connecting portion is not pivoted beyond a predetermined angle.

* * * * *